US007010419B2

(12) United States Patent
Abe et al.

(10) Patent No.: US 7,010,419 B2
(45) Date of Patent: Mar. 7, 2006

(54) SIGNAL PROCESSOR

(75) Inventors: Minoru Abe, Tokyo (JP); Manabu Yamashita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/037,050

(22) Filed: Jan. 19, 2005

(65) Prior Publication Data

US 2005/0261821 A1 Nov. 24, 2005

(30) Foreign Application Priority Data

May 24, 2004 (JP) ............................ 2004-152774

(51) Int. Cl.
*F02D 45/00* (2006.01)
*G01L 23/22* (2006.01)

(52) U.S. Cl. ...................................................... 701/111

(58) Field of Classification Search ................ 701/111, 701/102, 115

See application file for complete search history.

(56) References Cited

U.S. PATENT DOCUMENTS 6,075,401 A 6/2000 Inoue et al.

FOREIGN PATENT DOCUMENTS

| | | | |
|---|---|---|---|
| EP | 0 539 071 A2 * | | 4/1993 |
| JP | 5-306645 A | | 11/1993 |
| JP | 11-205113 A | | 7/1999 |
| JP | 2002-4933 A * | | 1/2002 |
| JP | 2002-16460 A | | 1/2002 |
| JP | 2002-130043 A | | 5/2002 |

* cited by examiner

*Primary Examiner*—Hieu T. Vo
(74) *Attorney, Agent, or Firm*—Sughrue Mion, PLLC

(57) ABSTRACT

The present invention provides a signal processor including a microprocessor for generating and supplying a control signal pulse train, a gain control circuit having a first switching device opened/closed by the control signal pulse train and resistors for determining an amplification factor with respect to a signal voltage as input and varying the resistances of the resistors in response to a pulse duty of the control signal pulse train, thereby controlling the amplification factor with respect to the signal voltage as input, and a switched capacitor filter circuit having second switching devices opened/closed by the control signal pulse train and a charging/discharging capacitor connected to the second switching devices, thereby adjusting filter characteristics in response to the pulse frequency of the control signal pulse train. The control signal pulse train is supplied commonly to the first and second switching devices.

19 Claims, 20 Drawing Sheets

SIGNAL PROCESSOR

BACKGROUND OF THE INVENTION

1. Field of the Invention

The present invention relates to a signal processor, and more particularly to a signal processor for use in an internal combustion engine.

2. Description of the Background Art

Among signal processors for use in internal combustion engines or the like, an analog input signal processor having the function of adjusting both the gain and frequency characteristics of the input signal processor has publicly been known, which is shown in, for example, Japanese Patent Application Laid-Open No. 2002-16460 (FIG. 1 and Abstract). JP 2002-16460 describes an invention related to a gain control circuit, and presents the concept of changing the switching duty ratio of switching devices connected in parallel or in series to a resistor that determines the gain of an operational amplifier, thereby adjusting the gain as well as controlling frequency characteristics of a filter in an alternating current amplifier.

A switched capacitor filter circuit is widely in practical use as a component of a filter circuit, which is shown in, for example, Japanese Patent Application Laid-Open No. 11-205113 (1999) (FIG. 11 and paragraphs 0002 to 0013). JP 11-205113 describes an invention related to a switching circuit and a switched capacitor filter circuit, and presents the concept of charging/discharging a capacitor having a capacitance C1 in a variable cycle Ts, thereby obtaining an equivalent variable resistance where a resistance value R is expressed as Ts/Cl.

Further, Japanese Patent Application Laid-Open No. 2002-130043 (FIG. 1, paragraphs 0017 and 0018) describes an invention related to a signal processor for use in an internal combustion engine or the like, and presents the concept of a knock detector for an engine provided with a switched capacitor filter circuit constituting a band-pass filter, a variable gain amplifier circuit and a peak hold circuit.

Furthermore, Japanese Patent Application Laid-Open No. 5-306645 (1993) (FIG. 11 and paragraph 0044) describes an invention related to a knock detector for an internal combustion engine, and presents the concept of adjusting the signal-passing frequency bandwidth of a switched capacitor filter circuit constituting a band-pass filter in accordance with operating conditions of the internal combustion engine.

The gain control circuit described in the above-mentioned JP 2002-16460 does not involve the concept of changing switching frequencies of the switching devices. That is, JP 2002-16460 describes that changing the switching duty ratio of the switching devices causes the gain and frequency characteristics of the filter to be varied in synchronization with each other, so that the maximum gain and frequency characteristics cannot be varied independently.

In the signal processor described in the above-mentioned JP 2002-130043 or 5-306645, signals for varying the filter characteristics and for varying the gain characteristics, respectively, are separated and supplied independently. That is, either JP 2002-130043 or 5-306645 requires a control part to supply two types of control signals.

Further, in the case where it is desired to increase, for example, the maximum gain or filter characteristics of an input signal processor by 10% in a signal processor for use in an internal combustion engine or the like, the maximum gain or filter characteristics exhibit an increase ranging from 20 to 0% if there is an error of 10% due to fluctuations in numeric value in circuit components. This causes a problem in that the purpose of improvements is not achieved. In the case where a more delicate adjustment is required, the influence of fluctuations in numeric value in circuit components will be a more serious drawback. Therefore, in adjusting the gain or filter characteristics of an input signal processor, correcting fluctuations in numeric value in circuit components is a realistic challenge, and the gain and frequency characteristics of an input signal processor are closely related to each other.

SUMMARY OF THE INVENTION

An object of the present invention is to provide a signal processor capable of adjusting variably the maximum gain and filter characteristics of the signal processor independently with one control signal.

According to the present invention, the signal processor includes a microprocessor, a gain control circuit and a switched capacitor filter circuit. The microprocessor generates and supplies a control signal pulse train. The gain control circuit has a first switching device opened/closed by the control signal pulse train supplied from the microprocessor and a resistor for determining an amplification factor with respect to a signal voltage as input, and opens/closes the first switching device to vary a resistance value of the resistor in response to a pulse duty of the control signal pulse train, thereby adjusting the amplification factor with respect to the signal voltage. The switched capacitor filter circuit has a second switching device opened/closed by the control signal pulse train supplied from the microprocessor and a charging/discharging capacitor connected to the second switching device, and variably adjusts filter characteristics in response to a pulse frequency of the control signal pulse train. The control signal pulse train is commonly supplied to the first and second switching devices.

The control signal pulse train is commonly supplied to the first switching device of the gain control circuit and the second switching device of the switched capacitor filter circuit. Therefore, the maximum gain and filter characteristics can be adjusted independently with one control signal pulse train without the need to generate and supply separate control signal pulse trains to the gain control circuit and switched capacitor filter circuit, respectively.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
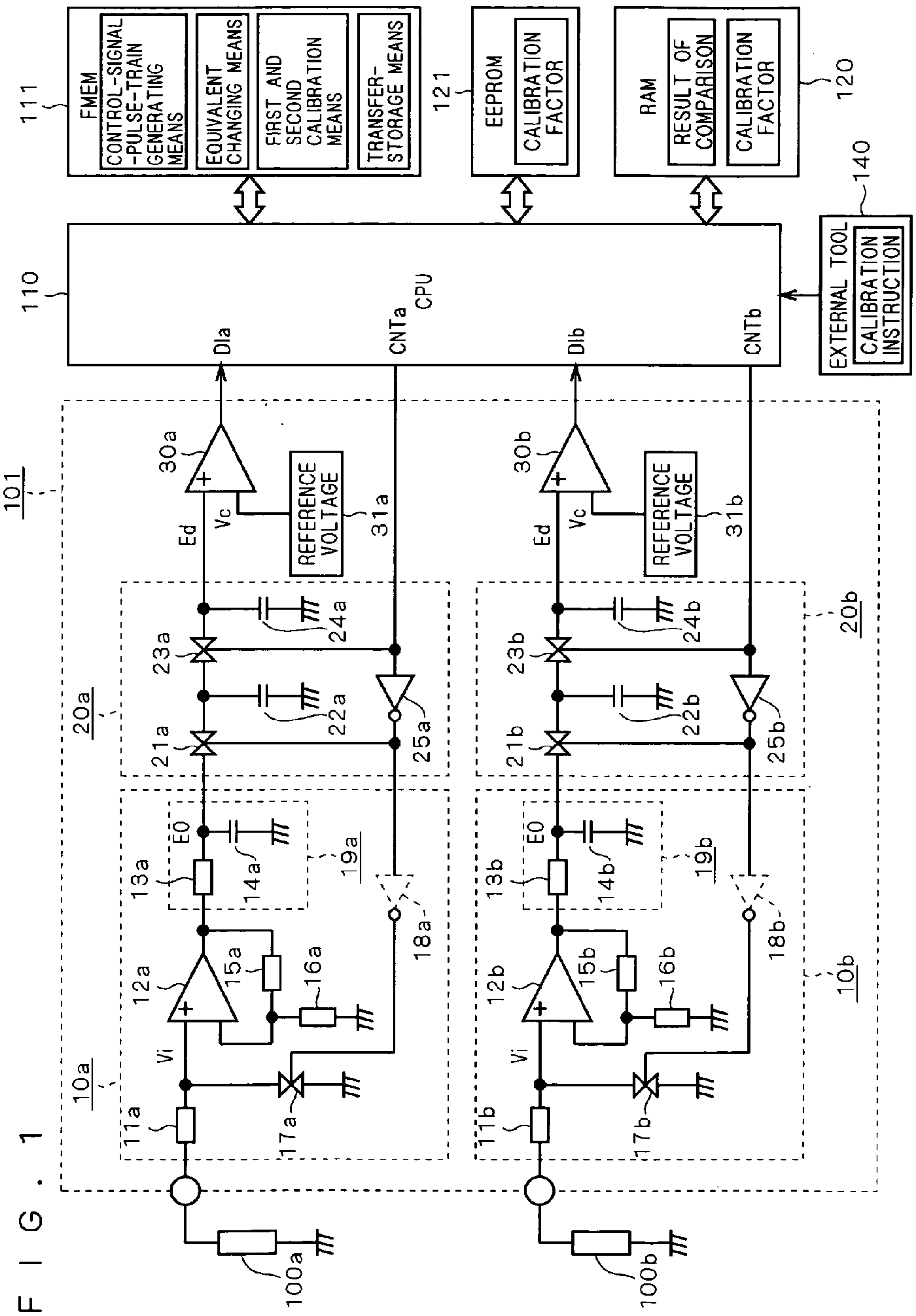
FIG. 1 is a circuit diagram of a signal processor according to a first preferred embodiment of the present invention.

FIG. 1 is a circuit diagram of a signal processor according to the present embodiment. The following discussion is provided in reference to FIG. 1. An analog input signal processor 101 shown in FIG. 1 is provided between variable analog signal sources 100*a*, 100*b* and a microprocessor 110. The analog input signal processor 101 according to the present embodiment is formed by gain control circuits 10*a*, 10*b*, switched capacitor filter circuits 20*a*, 20*b* each constituting a low-pass filter circuit, and analog comparator circuits 30*a*, 30*b* serving as data converters. Output voltages of the analog signal sources 100*a* and 100*b* as input to the analog input signal processor 101 are compared with standard reference voltages 31*a* and 31*b*, respectively, and the results are input to the microprocessor 110 as digital logic signals DIa and DIb, respectively.

Now, the gain control circuit 10*a* will be described in detail. The gain control circuit 10*a* includes an amplifier 12*a* with an input resistor 11*a* connected to its non-reverse input terminal, a smoothing resistor 13*a* and a smoothing capacitor 14*a* both connected to the output terminal of the amplifier 12*a*, resistance type potential dividers 15*a* and 16*a* both connected to the output terminal of the amplifier 12*a*, an amplification-factor-adjusting switching device 17*a* for grounding an input signal terminal and an inverter 18*a* for supplying a switching signal to the switching device 17*a*. An input voltage Vi output from the variable analog signal source 100*a* (hereinafter referred to as a signal voltage) is supplied to the non-reverse input terminal of the amplifier 12*a* through the input resistor 11*a*. The junction of the potential dividers 15*a* and 16*a* is connected to the reverse input terminal of the amplifier 12*a*. The smoothing resistor 13*a* and smoothing capacitor 14*a* constitute a smoothing filter circuit 19*a*.

The voltage across the smoothing capacitor 14*a* is applied to the input terminal of the switched capacitor filter circuit 20*a* as an output voltage E0 of the gain control circuit 10*a*. When a switching device 21*a* of the switched capacitor filter circuit 20*a* conducts, charge and discharge occur between a charging/discharging capacitor 22*a* and the smoothing capacitor 14*a* to cause the charging/discharging capacitor 22*a* to have the same voltage E0 as the smoothing capacitor 14*a*. At this time, an electric charge Q1 accumulated at the charging/discharging capacitor 22*a* is expressed as E0×C22*a* where C22*a* is a capacitance of the charging/discharging capacitor 22*a*.

When a switching device 23*a* operating reversely conducts subsequently to the switching device 21*a*, charge and discharge occur between the charging/discharging capacitor 22*a* and an integration capacitor 24*a* to cause the integration capacitor 24*a* and the charging/discharging capacitor 22*a* to have the same voltage Ed. At this time, a remaining electric charge Q2 accumulated at the charging/discharging capacitor 22*a* is expressed as Ed×C22*a*.

The switching devices 21*a* and 23*a* of the switched capacitor filter circuit 20*a* are opened/closed in a pulse cycle Ta. Therefore, the amount of charge moving in a period of the pulse cycle Ta is expressed as $\Delta Q=Q1-Q2=(E0-Ed)\times C22a$, and the average current flowing from the smoothing capacitor 14*a* to the integration capacitor 24*a* is expressed as $I=\Delta Q/Ta=(E0-Ed)\times C22a/Ta$.

Therefore, an equivalent resistance Ra of the switched capacitor filter circuit 20*a* determined by the switching devices 21*a*, 23*a* and charging/discharging capacitor 22*a* is expressed by the following equation (1), and serves as a variable resistance that varies in accordance with the value of the pulse cycle Ta.

$$Ra=(E0-Ed)/I=Ta/C22a \tag{1}$$

The output voltage Ed of the integration capacitor 24*a* is applied to the non-reverse input terminal of the analog comparator circuit 30*a*, while the standard reference voltage 31*a* of a predetermined voltage Vc is applied to the reverse input terminal of the analog comparator circuit 30*a*.

The switching device 23*a* is opened/closed by a control signal pulse train CNTa generated by the microprocessor 110. The switching device 21*a* also opened/closed by the control signal pulse train CNTa through an inverter 25*a*. The output of the inverter 25 is supplied to the input terminal of the inverter 18*a* to control the opening/closing operation of the switching device 17*a*. In the gain control circuit 10*a* shown in FIG. 1, the switching device 21*a* is not conducting when the switching device 17*a* is conducting, however, the inverter 18*a* may be omitted and the switching devices 17*a* and 21*a* may be configured to conduct simultaneously.

The gain control circuit 10*b*, switched capacitor filter circuit 20*b* and analog comparator circuit 30*b* are configured similarly, and are controlled by a control signal pulse train CNTb generated by the microprocessor 110.

As shown in FIG. 1, a non-volatile program memory 111 and a RAM memory 120 are bus-connected to the microprocessor 110 according to the present embodiment. The non-volatile program memory 111 is formed by a flash memory, FMEM and the like, and stores programs serving as control-signal-pulse-train generating means, equivalent changing means, first and second calibration means and transfer-storage means, a program for communicating with an external tool 140, a control program depending on applications of the microprocessor 110, and the like. The RAM memory 120 temporarily stores the results of comparisons made by the analog comparator circuits 30*a*, 30*b* and calibration factors obtained by calibrations performed by the first and second calibration means.

Further, the microprocessor 110 according to the present embodiment is provided with a bus-connected or serial-connected non-volatile data memory 121 such as an EEPROM and serial-connected external tool 140. The calibration factors obtained as a result of calibrations performed by the first and second calibration means are transferred from the RAM memory 120 to the non-volatile data memory 121 to be stored therein. The external tool 140 transmits first and second calibration instructions to the microprocessor 110.

The flash memory used in the program memory 111 is a mass-storage non-volatile memory electrically programmable, readable and capable of power failure memory, which, however, requires electrical batch erasure before programming. The EEPROM used in the non-volatile data memory 121 is a small-storage memory electrically programmable and readable freely in a byte and capable of power failure memory. The RAM memory 120 is electrically programmable and readable freely at high speeds in a byte, however, information stored therein is erased at the time of power failure.

Figure 2A:
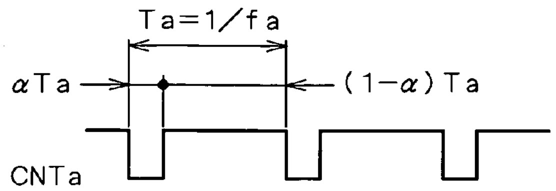
FIGS. 2A through 2E are timing charts of the signal processor according to the first preferred embodiment.
Figure 2B:
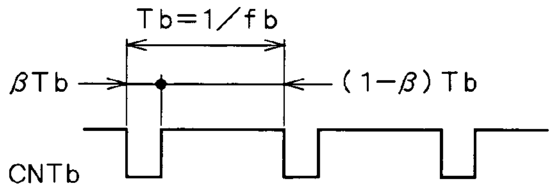

Next, the operation of the signal processor according to the present embodiment will be discussed. FIGS. 2A through 2E are timing charts of the signal processor. FIG. 2A shows the waveform of the control signal pulse train CNTa whose logical level is alternately reversed in the pulse cycle Ta which is the reciprocal of a frequency fa. Here, a pulse duty a of the pulse cycle Ta is defined as a ratio between the period in which the logical level is in the "L" state and the pulse cycle Ta. FIG. 2B shows the waveform of the control signal pulse train CNTb whose logical level is alternately reversed in a pulse cycle Tb which is the reciprocal of a frequency fb. A pulse duty P of the pulse cycle Tb is defined as a ratio between the period in which the logical level is in the "L" state and the pulse cycle Tb.

Figure 2C:
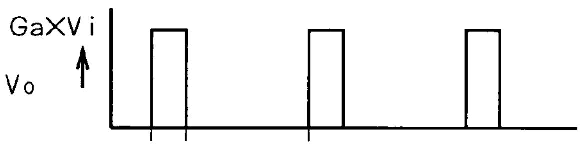

FIG. 2C shows the waveform of the output voltage V0 of the amplifier 12*a*, in which the output voltage V0 is expressed as Ga×Vi when the control signal pulse train CNTa is in the logical level of "L" to cause the switching device 17*a* not to conduct, and is 0V when the control signal pulse train CNTa is in the logical level of "H" to cause the switching device 17*a* to conduct. Here, the gain Ga=(Resistance R15 of the potential divider 15*a*+Resistance R16 of the potential divider 16*a*)/Resistance R16 of the potential divider 16*a*.

Figure 2D:
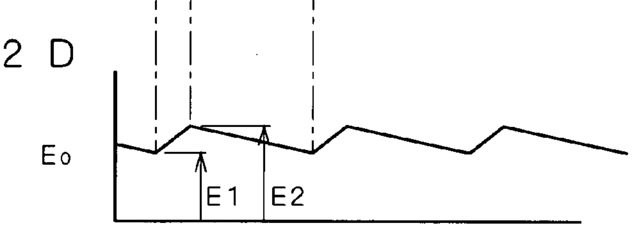

FIG. 2D shows the waveform of the output voltage E0 of the smoothing filter circuit 19*a*. Assuming that (Integration time constant τs of the smoothing filter circuit 19*a*)=(Resistance R13*a* of the smoothing resistor 13*a*)×(Capacitance C14 of the smoothing capacitor 14*a*), the output voltage E0 is expressed as E0≈E2≈E1 if Ta<<<τs=R13×C14 holds, and is calculated by the following expression (2). This also applies to the gain control circuit 10*b* side.

$$E0 \approx Ga \times a \times Vi$$

$$Ga = (R15 + R16)/R16 \qquad (2)$$

Figure 2E:
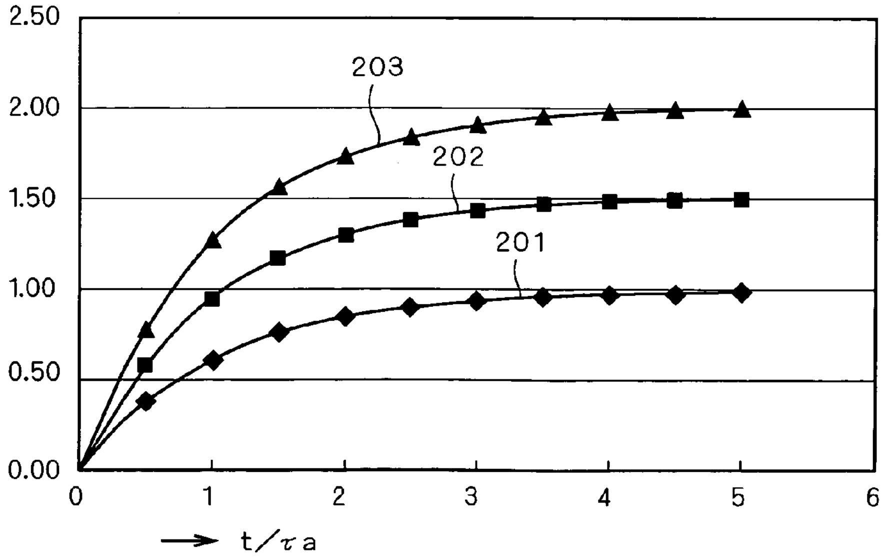

FIG. 2E shows the waveform of the output voltage Ed of the switched capacitor filter circuit 20*a* with respect to an elapsed time t during which the output voltage of the variable analog signal source 100*a* is kept constant and applied to the gain control circuit 10*a* at a predetermined pulse duty α. In FIG. 2E, the output voltage Ed is shown by curves 201, 202 and 203 each having a different pulse duty α. The vertical axis of the graph shown in FIG. 2E indicates the ratio of the output voltage Ed to the saturation voltage of the output voltage Ed shown by the curve 201. As seen from the expression (2), the output voltage Ed is proportional to the pulse duty α. Accordingly, the pulse duty a of the curve 202 is 1.5 times that of the curve 201, and that of the curve 203 is 2.0 times that of the curve 201. In FIG. 2E, the saturation output voltage when the elapsed time t has a sufficiently great value becomes equal to the output voltage E0 of the gain control circuit 10*a*, which is shown by the expression (2).

In each waveform of the output voltage Ed, an elapsed time until the output voltage Ed reaches 63% of the saturation output voltage corresponds to the integration time constant Ta. This integration time constant τa is calculated by the following expression (3) assuming that the capacitance of the integration capacitor 24*a* is C24*a*. The horizontal axis of the graph shown in FIG. 2E indicates the quotient obtained by dividing the elapsed time t by the integration time constant τa.

$$\tau a = Ra \times C24a = Ta \times C24a/C22a \qquad (3)$$

In the case where the saturation output voltage of the switched capacitor filter circuit 20*a* agrees with the standard reference voltage Vc, the relation between the signal voltage Vi and the pulse duty a is shown by the following expression (4).

$$Ga \times a \times Vi = Vc \therefore Vi = Vc/(Ga \times \alpha) \qquad (4)$$

Figure 3:
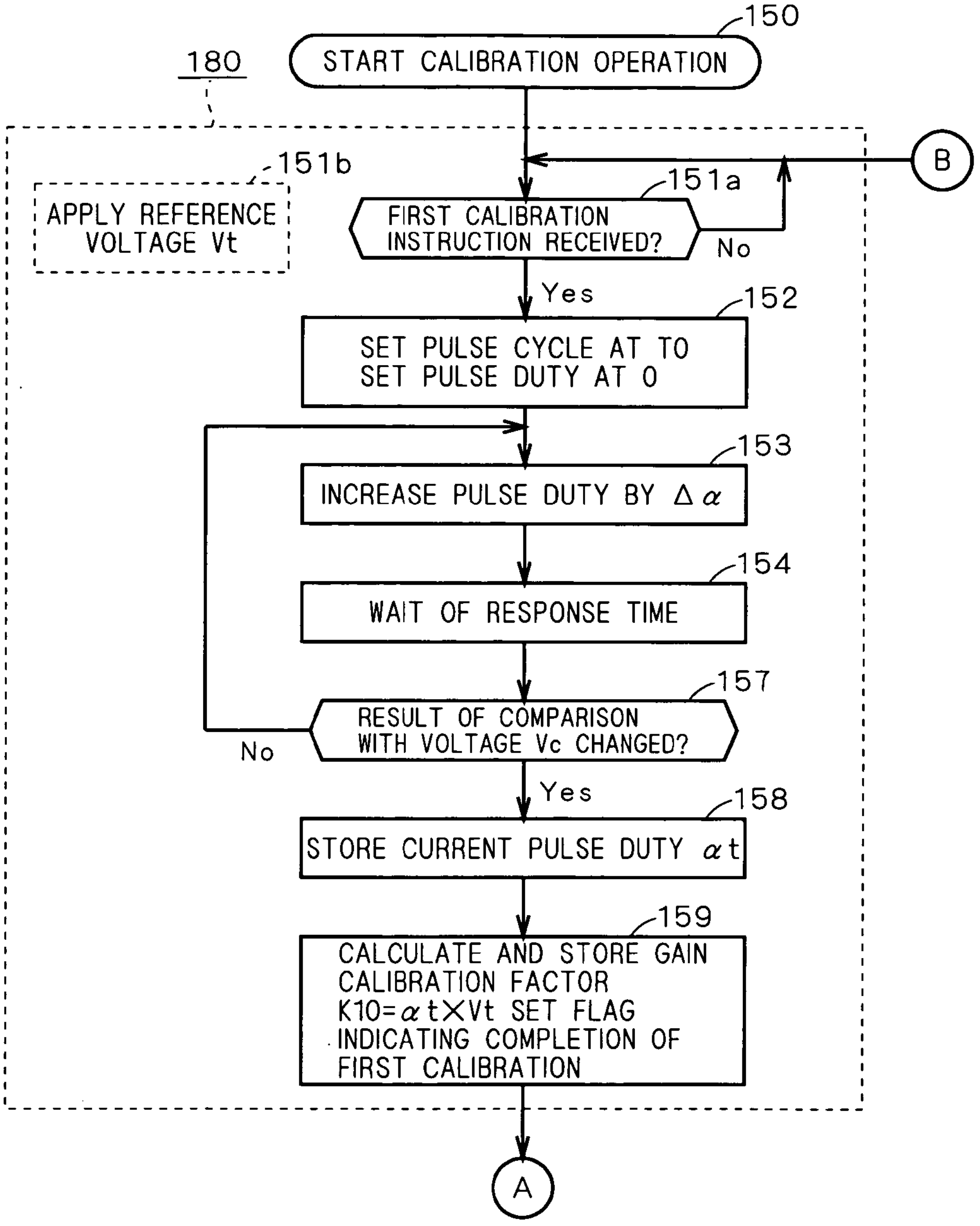
FIGS. 3 and 4 are flow charts of a calibration operation of the signal processor according to the first preferred embodiment.
Figure 4:
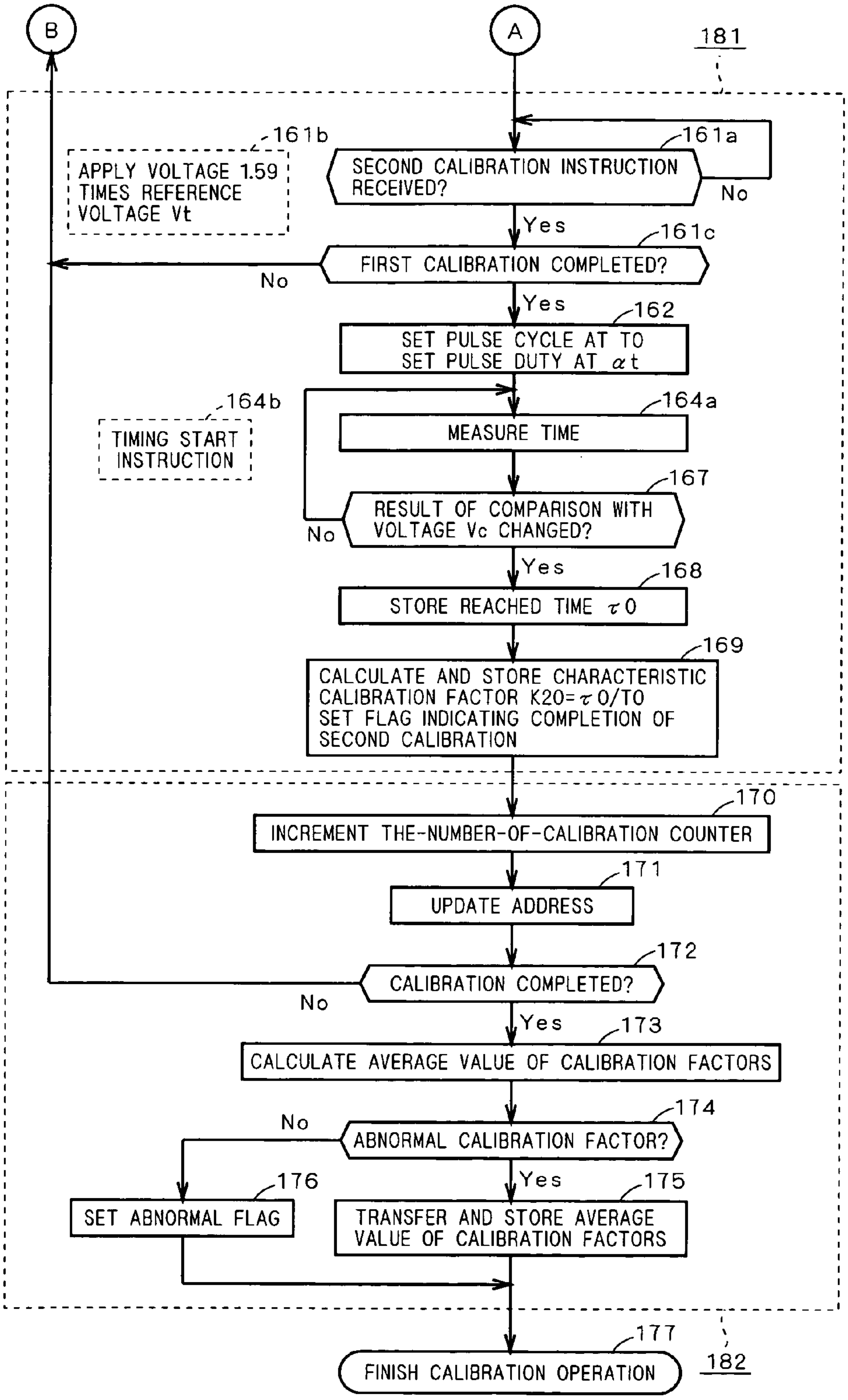

Next, a calibration operation is performed on such values as the standard reference voltage Vc, gain Ga, and capacitances C22*a* and C24*a* which are assumed to fluctuate. FIGS. 3 and 4 are flow charts of the calibration operation of the signal processor according to the present embodiment. In a step 150 shown in FIG. 3, the calibration operation is started by supplying power to the microprocessor 110. In the subsequent step 151*a*, it is judged whether the first calibration instruction has been received from the external tool 140, and when the first calibration instruction has not been received, the step 151*a* is repeated to wait until the first calibration instruction is received. Before the external tool 140 transmits the first calibration instruction, a calibration-specific signal source is connected to the signal processor according to the present embodiment in place of the variable analog signal source 100*a* as shown in a block 151*b*, so that a calibration-specific reference voltage Vt of 3.15V, for example, is applied to the gain control circuit 10*a*. This reference voltage Vt is determined by the following procedure. Assuming that a reference pulse duty α0 is 0.5 and a design theoretical value of the gain Ga is 2 in the case where a design theoretical value of the standard reference voltage 31*a* of the analog comparator circuit 30*a* is set at Vc=3.15V, for example, the expression Vi=Vc/(Ga×α5)=3.15/(2×0.5) =3.15V holds based on the relation of the equation (4). Accordingly, it is determined that the calibration-specific reference voltage Vt is set at 3.15V.

Assuming that an actual product has the pulse duty α0=0.5, standard reference voltage Vc of 3.15V and gain Ga of 2.0 as design theoretical values, and applying the calibration-specific reference voltage Vt of 3.15V as the signal voltage Vi, the output voltage Ed of the switched capacitor filter circuit 20*a* is judged by the analog comparator circuit 30*a* to be equal to the standard reference voltage Vc at which the logical level of the digital logic signal DIa changes. However, if there is an error in the gain Ga or standard reference voltage Vc in an actual product, the pulse duty α0=0.5 does not allow the output voltage Ed to agree with the standard reference voltage Vc. Thus, a pulse duty αt at which the output voltage Ed agrees with the standard reference voltage Vc is necessary to be searched for.

When the first calibration instruction is received, it is judged YES in the step 151*a* shown in FIG. 3, and a step 152 is executed. In the step 152, a practical average value of the pulse cycle Ta of the control signal pulse train CNTa is set at a representative value T0, and the pulse duty a is set at 0. In the subsequent step 153, the calibration-specific reference voltage Vt of 3.15V is applied to the gain control circuit 10*a* with the pulse duty increased slightly by Δa from the current state. In the subsequent step 154, there is a long wait sufficiently greater than the integration time constant τa of the switched capacitor filter circuit 20*a*, and in the subsequent step 157, it is judged whether the logical level of the digital logic signal DIa output from the analog comparator circuit 30*a* has changed. It is judged in the step 157 that there is no change in the logical level of the digital logic signal DIa, the process goes back to the step 153, where the pulse duty is further increased slightly by $\Delta\alpha$, and if there is a change, the process proceeds into a step 158, where the pulse duty $\alpha t$ at the time of change is stored.

In a step 159 subsequent to the step 158, the product of the pulse duty at as stored and the calibration-specific reference voltage Vt of a known value is calculated, and the result is stored as a gain calibration factor $K10=\alpha t\times Vt$. Further, in the step 159, a flag indicating the completion of a first calibration based on the first calibration instruction is set. The standard reference voltage Vc is divided by the gain Ga both assumed to fluctuate based on the equation (4) as indicated by the following equation (5).

$$Vc/Ga=\alpha t\times Vt=K10 \tag{5}$$

Representing the expression (4) using the calibration factor K10 obtained by the equation (5), the following equation (6) is obtained. The equation (6) shows the signal voltage Vi for making the saturation output voltage of the switched capacitor filter circuit 20*a* equal to the standard reference voltage Vc. It also shows that the signal voltage Vi is proportional to the calibration factor K10 and is variable depending on the pulse duty a.

$$Vi=K10/\alpha \tag{6}$$

Upon receipt of the setting of the flag in the step 159, the external tool 140 multiplies the calibration-specific reference voltage Vt by, for example, 1.59 through control means (not shown) to be set at 5.0V, and transmits the second calibration instruction. In a step 161*a* shown in FIG. 4 subsequent to the step 159, it is judged whether the second calibration instruction has been received from the external tool 140, and when the second calibration instruction has not been received, the process goes back to the step 161*a* to wait until the second calibration instruction is received.

When it is judged YES in the step 161*a* upon receipt of the second calibration instruction, a step 161*c* is executed to monitor the operation of the flag set in the step 159 to judge whether the first calibration has been completed. When the first calibration has not been completed, the process goes back to the step 151*a*, and when the first calibration has been completed, the process proceeds into a step 162. In the step 162, a practical average value of the pulse cycle Ta of the control signal pulse train CNTa is set at the representative value T0, and the pulse duty $\alpha$ is set at $\alpha t$ stored in the step 158.

In a step 164*a* subsequent to the step 162, an elapsed time since the calibration-specific reference voltage Vt of 5.0V is applied based on a timing start instruction from the external tool 140 shown in a block 164*b*. In the subsequent step 167, it is judged whether the logical level of the digital logic signal DIa which is the result of comparison output from the analog comparator circuit 30*a* has changed, and when there is no logic change, the process goes back to the step 164*a* to continue timing, and when the logical level has changed, the process proceeds into a step 168, where a currently timed value obtained in the step 164*a* is stored as a reached time $\tau$0.

Since the calibration-specific reference voltage Vt is 5.0V, the saturation output voltage of the switched capacitor filter circuit 20*a* is also 5.0V, that is, 1.59 times the standard reference voltage Vc of 3.15V. A 63% value of the saturation output voltage is 3.15V, and therefore, the reached time $\tau$0 obtained in the step 168 corresponds to the integration time constant of the switched capacitor filter circuit 20*a*.

In a step 169 subsequent to the step 168, the integration time constant $\tau$0 stored in the step 168 is divided by the pulse cycle T0 set in the step 162 and the resultant quotient is stored as a filter characteristic calibration factor K20. Further, in the step 169, a flag indicating the completion of a second calibration based on the second calibration instruction is set.

Substituting the integration time constant $\tau$0 and the pulse cycle T0 both measured in the calibration operation into the equation (3), the value (C24*a*/C22*a*) assumed to fluctuate is obtained as the following equation (7). Substituting the relation shown in the equation (7) again into the equation (3), the integration time constant Ta when the pulse cycle is Ta can be shown as the following equation (8).

$$(C24a/C22a)=\tau 0/T0=K20 \tag{7}$$

$$\tau a=Ta\times K20 \tag{8}$$

Next, in a step 170 subsequent to the step 169, the-number-of-calibration counter is incremented, and in the subsequent step 171, addresses at which the calibration factors K10 and K20 obtained in the steps 159 and 169, respectively, are stored are updated. In the subsequent step 172, it is judged whether a predetermined number of calibrations have been completed, and when the predetermined number of calibrations have not been completed, the process goes back to the step 151*a* to start a calibration operation again, and when the predetermined number of calibrations have been completed, the process proceeds into a step 173. In the step 173, a statistic value such as an average, mode or median of a plurality of gain calibration factors K10 and that of a plurality of filter characteristic calibration factors K20 stored in the RAM memory 120 are calculated and stored in the RAM memory 120 at the addresses updated in the step 171.

In the subsequent step 174, it is judged whether the calibration factors K 10 and K20 calculated and stored in the step 173 fall within an allowable numerical range, and when there is no abnormality, the process proceeds into a step 175, and when there is an abnormality, the process proceeds into a step 176. In the step 175, the calibration factors KI0 and K20 calculated and stored in the step 173 are transferred to and stored in the non-volatile data memory 121. In the step 176, an abnormal flag is set to inform abnormality to the external tool 140. Subsequently to the step 175 or 176, the calibration operation is completed in a step 177.

The pulse duty $\alpha$ is set at 0 in the step 152, however, it may be set at 1, for example, and the calibration operation may be performed such that the pulse duty is slightly decreased in the subsequent step 153. Further, the calibration-specific reference voltage Vt is multiplied by 1.59 in the block 161*b* of the present embodiment, however, the pulse duty at may be multiplied by 1.59 instead of multiplying the calibration-specific reference voltage Vt by 1.59. Furthermore, the calibration-specific signal source may intentionally be varied in voltage in each of a plurality of calibration operations so as to perform measured calibrations widely applicable to practical use.

In the above-described calibration operation, a process block 180 including the steps 151*a* to 159 serves as the first calibration means for calculating the gain calibration factor K10 while monitoring the output of the analog comparator circuit 30*a* using the calibration-specific signal source having a known voltage. A process block 181 including the steps 161*a* to 169 serves as the second calibration means for calculating the filter characteristic calibration factor K20 while monitoring the output of the analog comparator circuit 30*a* using the calibration-specific signal source having a known voltage. Further, a process block 182 including the steps 170 to 175 serves as the transfer-storage means, and the step 172 serves as the repetitive calibration means.

Although FIGS. 3 and 4 show the calibration operation for the gain control circuit 10*a*, switched capacitor filter circuit 20*a* and analog comparator circuit 30*a*, a similar calibration operation is performed for the gain control circuit 10*b*, switched capacitor filter circuit 20*b* and analog comparator circuit 30*b*.

As is apparent from the above description, the signal processor according to the present embodiment processes the signal voltages of the variable analog signal sources 100*a* and 100*b* and input them to the microprocessor 110. The signal processor according to the present embodiment is formed by the analog input signal processor 101, microprocessor 110 and the like. The analog input signal processor 101 at least includes the switched capacitor filter circuits 20*a*, 20*b*, gain control circuits 10*a*, 10*b* and analog comparator circuits 30*a*, 30*b*. The microprocessor 110 contains, in the non-volatile program memory 1111 operating in cooperation therewith, programs serving as the control-signal-pulse-train generating means, equivalent changing means, first and second calibration means 180 and 181, transfer-storage means 182 and the like.

In the signal processor according to the present embodiment, the microprocessor 110 is configured to supply the control signal pulse train CNTa commonly to the switched capacitor filter circuit 20*a* and gain control circuit 10*a* and to supply the control signal pulse train CNTb commonly to the switched capacitor filter circuit 20*b* and gain control circuit 10*b* using the control-signal-pulse-train generating means. The switched capacitor filter circuit 20*a* includes the switching devices 21*a*, 23*a* and charging/discharging capacitor 22*a*, and the switched capacitor filter circuit 20*b* includes the switching devices 21*b*, 23*b* and charging/discharging capacitor 22*b*, and filter characteristics of the switched capacitor filter circuits 20*a*, 20*b* are adjusted variably in response to pulse frequencies of the control signal pulse trains CNTa and CNTb, respectively.

The gain control circuit 10*a* is instructed by the microprocessor 110 to open/close the amplification-factor-adjusting switching device 17*a* by the control signal pulse train CNTa for variably adjusting the amplification factor with respect to the input signal voltage in response to the pulse duty representing ON period/cycle of the control signal pulse train CNTa. The analog comparator circuit 30*a* converts a currently detected value in response to the signal voltage from the variable analog signal source 100*a* obtained through the switched capacitor filter circuit 20*a* and gain control circuit 10*a* to the digital logic signal DIa and inputs the digital logic signal DIa to the microprocessor 110. This also applies on the part of the gain control circuit 10*b* and switched capacitor filter circuit 20*b*. The digital logic signals DIa and DIb are written in the RAM memory 120 serving as a detected data memory through the microprocessor 110 and are stored therein.

Next, the first calibration means 180 measures the relation between the pulse duty a of the gain control circuit and the state of the data converter based on the first calibration instruction with a predetermined calibration-specific signal source connected to the signal processor in place of the variable analog signal source, thereby obtaining the gain calibration factor K10 as a first calibration factor. The gain calibration factor K10 is stored in the non-volatile data memory 121 by the transfer-storage means 182. The second calibration means 181 measures the relation between the pulse cycle of the control signal pulse train and actually obtained filter characteristics based on the second calibration instruction with the predetermined calibration-specific signal source connected to the signal processor in place of the variable analog signal source, thereby obtaining the filter characteristic calibration factor K20 as a second calibration factor. The filter characteristic calibration factor K20 is stored in the non-volatile data memory 121 by the transfer-storage means 182.

The microprocessor 110 operates at the time when the calibration operation is completed, and includes: the transfer-storage means 182 for transferring the results of calibrations performed by the first and second calibration means 180 and 181 to the non-volatile data memory 121 to be written therein; and the control-signal-pulse-train generating means for calibrating fluctuations from design theoretical values in actually used components based on the gain calibration factor K10 and filter characteristic calibration factor K20 stored in the non-volatile data memory 121 in a normal operation after the calibration operation is completed, thereby generating a control signal pulse train having a variable frequency and a variable pulse duty. The signal processor according to the present embodiment is configured as above described, and thus can adjust the maximum gain and filter characteristics independently with one control signal and can calibrate fluctuations in numeric value in circuit components such as resistors and capacitors.

In the signal processor according to the present embodiment, the data converters compare the signal voltages obtained through the switched capacitor filter circuits 20*a*, 20*b* and gain control circuits 10*a*, 10*b* with the standard reference voltages 31*a*, 31 *b*, respectively, and input the results of comparisons to the microprocessor 110 as the digital logic signals DIa, DIb, respectively, and the microprocessor 110 further includes equivalent changing means for changing the pulse duties of the control signal pulse trains CNTa, CNTb to change the input/output ratios of the gain control circuits 10*a*, 10*b*, for equivalently changing the standard reference voltages 31*a*, 31*b*, respectively. Therefore, standard reference voltages can be apparent adjusted by adjusting the amplification factors of the gain control circuits 10*a*, 10*b* even when the standard reference voltages 31*a* and 31*b* are fixed values.

Further, in the signal processor according to the present embodiment, the switched capacitor filter circuits 20*a*, 20*b* each constitute a low-pass filter circuit for cutting off a high-frequency noise signal, and the smoothing filter circuits 19*a*, 19*b* having integration time constants smaller than the smallest integration time constants of the switched capacitor filter circuits 20*a*, 20*b* are provided at the output stages of the gain control circuits 10*a*, 10*b*, respectively. Therefore, frequency characteristics of noise filters provided in the switched capacitor filter circuits 20*a*, 20*b* can be freely adjusted using the control signal pulse trains CNTa, CNTb output from the microprocessor 110, and the amplification factors of the gain control circuits 10*a*, 10*b* can be adjusted independently using the control signal pulse trains CNTa, CNTb, respectively.

Furthermore, in the signal processor according to the present embodiment, the first calibration means 180 detects the comparison-agreement pulse duty at obtained at the time when the result of comparison made by the analog comparator circuit having the standard reference voltage Vc changes while gradually increasing or decreasing the pulse duty of the control signal pulse train supplied to the gain control circuit assuming that the calibration-specific signal source generates the voltage Vt, thereby calculating the gain calibration factor K10=α×Vt. The second calibration means 181 measures the time t elapsed between the connection of the calibration-specific signal source and the change in the result of comparison made by the analog comparator circuit assuming that the voltage generated by the calibration-specific signal source is greater than the voltage Vt applied in the first calibration means 180 (e.g., 1.59 times the voltage Vt) and that the pulse duty is set at the comparison-agreement pulse duty at detected by the first calibration means 180. The integration time constant T0 of the low-pass filter is calculated based on the measured time t, and the filter characteristic calibration factor K20=τ0/T0 with respect to the pulse cycle T0 of the control signal pulse train at the time of calibration is calculated. The first calibration means 180 is executed prior to the second calibration means 181. The gradual increase or decrease of the pulse duty is performed by the first calibration means 180 step by step during a time period longer than an assumed integration time constant of the low-pass filter.

As described, in the signal processor according to the present embodiment, previously calibrating gain characteristics by the first calibration means 180 allows the integration time constant of the low-pass filter to be calibrated accurately and effectively using known gain characteristics as measured and stored. Moreover, the whole gain including fluctuations if any in the standard reference voltage from product to product can be calibrated.

Further, in the signal processor according to the present embodiment, the transfer-storage means 182 includes the repetitive calibration means 172 for causing the first and second calibration means 180, 181 to calculate the calibration factors by a plurality of times and transferring a statistic value such as an average, mode or median of a plurality of calibration factors obtained by the plurality of calibrations to the non-volatile data memory 121 to be written therein. This can achieve an improved calibration accuracy, and the number of writing into the non-volatile data memory 121 can be reduced since the final results are to be transferred to and stored in the non-volatile data memory 121.

Second Preferred Embodiment

Figure 5:
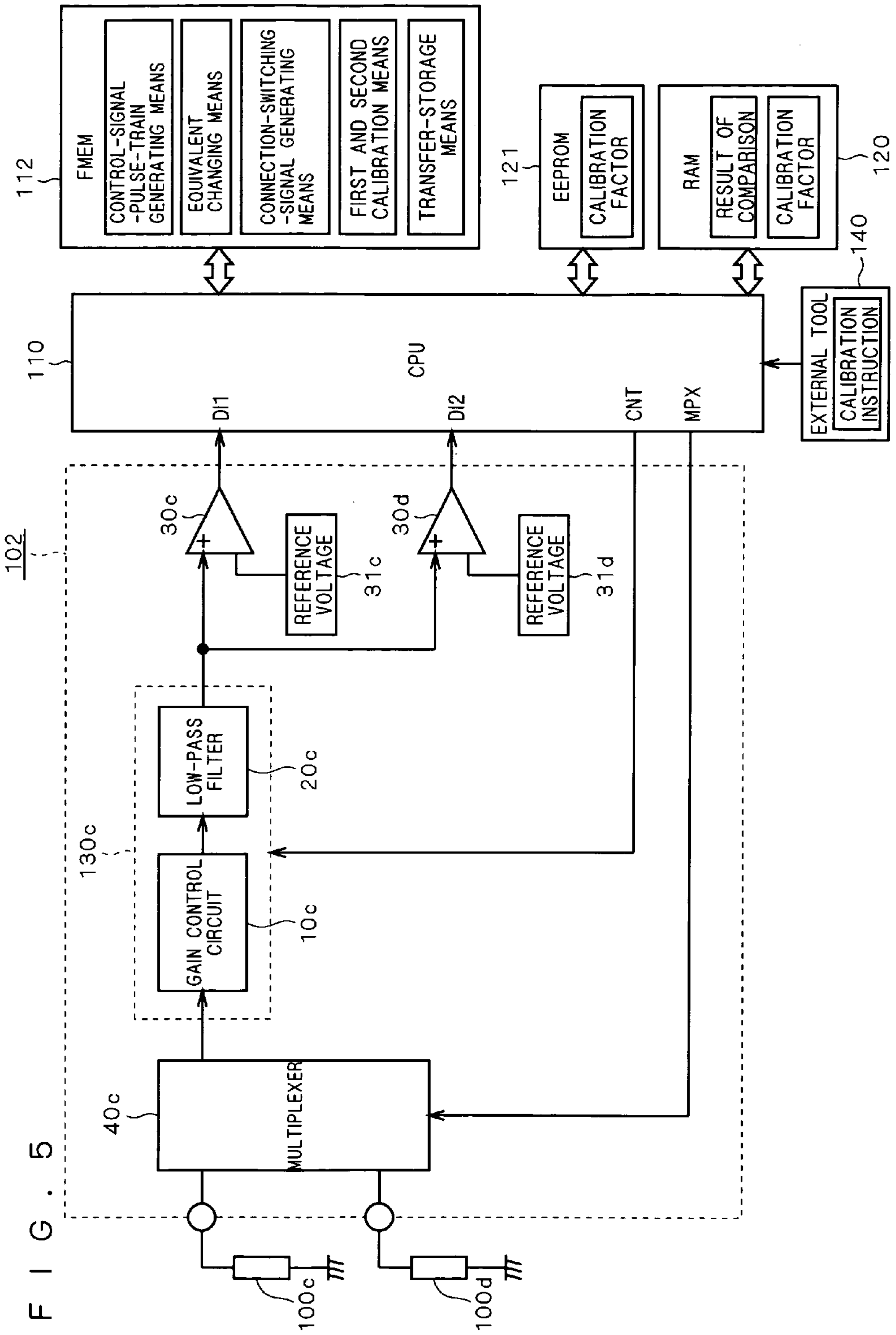
FIG. 5 is a circuit diagram of a signal processor according to a second preferred embodiment of the invention.

FIG. 5 is a circuit diagram of a signal processor according to the present embodiment. In FIG. 5, an analog input signal processor 102 is provided between variable analog signal sources 100*c*, 100*d* and the microprocessor 110. The analog input signal processor 102 according to the present embodiment includes a gain control circuit 10*c*, a switched capacitor filter circuit 20*c* constituting a low-pass filter circuit, analog comparator circuits 30*c*, 30*d* serving as data converters and a multiplexer 40*c*. The results of comparisons between the analog signal source 100*c* and standard reference voltages 31*c*, 31*d* are input to the microprocessor 110 as digital logic signals DI1 and DI2, respectively, and are stored in the RAM memory 120.

The multiplexer 40*c* switches connection from the variable analog signal source 100*c* to the variable analog signal source 100*d* in response to a connection switching signal MPX generated by the microprocessor 110. With this switching, the comparisons are made between the analog signal source 100*d* and the standard reference voltages 31*c*, 31*d*, respectively, and the results are input to the microprocessor 110 as the digital logic signals DI1, D12, respectively, and are stored in different address regions in the RAM memory 120.

The details of the gain control circuit 10*c* and switched capacitor filter circuit 20*c* are the same as the gain control circuit 10*a* and switched capacitor filter circuit 20*a* shown in FIG. 1. A control signal pulse train CNT is supplied from the microprocessor 110 to a circuit block 130*c* formed by the gain control circuit 10*c* and switched capacitor filter circuit 20*c*. This control signal pulse train CNT corresponds to the control signal pulse train CNTa shown in FIG. 1.

The analog comparator circuit according to the present embodiment includes the first and second comparator circuits 30*c*, 30*d*, and the second standard reference voltage 31*d* used in the second comparator circuit 30*d* is set at a greater value than the first standard reference voltage 31*c* used in the first comparator circuit 30*c*. As a result, the microprocessor 110 is capable of judging the signal voltages of the analog signal sources 100*c* and 100*d* in three stages.

The signal processor shown in FIG. 1 is also capable of making comparisons while varying the pulse duty a to large and small values alternately, and reads the results of comparisons discriminatingly, so that judgments can be made in multiple stages. In the signal processor shown in FIG. 1, however, varying the pulse duty a disadvantageously makes it difficult to achieve an improved responsibility in making comparisons. Therefore, the signal processor according to the present embodiment is provided with a multilevel analog comparator circuit for achieving an improved responsibility in an application for making comparisons while selectively switching among a plurality of analog signal sources by the multiplexer 40*c*.

In the signal processor according to the present embodiment, the method of an initial calibration is similar to that of the first preferred embodiment. In the present embodiment, however, two types of gain calibration factors need to be measured and stored in correspondence with the first and second standard reference voltages 31*c* and 31*d*, respectively. Further, for performing a plurality of calibrations, a plurality of calibration-specific signal sources may be connected instead of the plurality of variable analog signal sources, so that the multiplexer 40*c* switches among the plurality of calibration-specific signal sources to perform a calibration operation using a selected one of the calibration-specific signal sources.

As is apparent from the above description, the signal processor according to the present embodiment includes the first and second comparator circuits 30*c* and 30*d* as data converters, different from the first preferred embodiment. The first and second comparator circuits 30*c* and 30*d* convert currently detected values responsive to the signal voltages of the variable analog signal sources 100*c* and 100*d*, respectively, obtained through the switched capacitor filter circuit 20*c* and gain control circuit 10*c* into the digital logic signals DI1 and D12, respectively, and input the digital logic signals DI1 and D12 to the microprocessor 110. The digital logic signals DI1 and DI2 are written and stored in the RAM memory 120 serving as a detected data memory, through the microprocessor 110.

The signal processor according to the present embodiment can change the pulse duty of the control signal pulse train CNT by the equivalent changing means to change the input/output ratio of the gain control circuit 10*c*, thereby equivalently changing the standard reference voltages 31*c* and 31*d*. Thus, even when the first and second standard reference voltages 31*c* and 31*d* are fixed values, apparent standard reference voltages can be adjusted by adjusting the amplification factor of the gain control circuit 10*c*.

Further, in the signal processor according to the present embodiment, the analog comparator circuit at least includes the first and second comparator circuits 30*c* and 30*d*. The first comparator circuit 30*c* compares the signal voltage obtained through the switched capacitor filter circuit 20*c* and gain control circuit 10*c* with the first standard reference voltage 31*c*, and inputs the result of comparison to the microprocessor 110 as the digital logic signal DI1, while the second comparator circuit 30*d* compares the signal voltage obtained through the switched capacitor filter circuit 20*c* and gain control circuit 10*c* with the second standard reference voltage 31*d* greater than the first standard reference voltage 31*c*, and inputs the result of comparison to the microprocessor 110 as the digital logic signal DI2. This allows the signal voltages of the variable analog signal sources to be judged quickly in multiple levels. The present invention is also applicable to a configuration provided with three or more comparator circuits having standard reference voltages different from one another.

Furthermore, the signal processor according to the present embodiment includes the multiplexer 40*c* for switching connection of a plurality of signal sources and the switched capacitor filter circuit 20*c* and gain control circuit 10*c*, and the microprocessor 110 includes connection-switching-signal generating means for successively generating and supplying the connection switching signal MPX to the multiplexer 40*c*. Therefore, it is not necessary to increase the switched capacitor filter circuit 20*c*, gain control circuit 10*c* and first and second comparator circuits 30*c* and 30*d* even when a plurality of variable analog signal sources are connected to the signal processor, but it is sufficient to provide only two input terminals for the microprocessor 110. Further, in the case where the signal voltages of the variable analog signal sources 100*c* and 100*d* vary slowly and the switched capacitor filter circuit 20*c* has a relatively small integration time constant, outputs from the analog input signal processor 101 can be equalized by varying the amplification factor of the gain control circuit 10*c* even when the signal voltages from the variable analog signal sources are different from one another in the maximum value. The connection-switching-signal generating means causes data to be written in the RAM memory 120 through the first and second comparator circuits 30*c*, 30*d* and microprocessor 110 in separate pieces relative to the plurality of variable analog signal sources, respectively.

Third Preferred Embodiment

Figure 6:
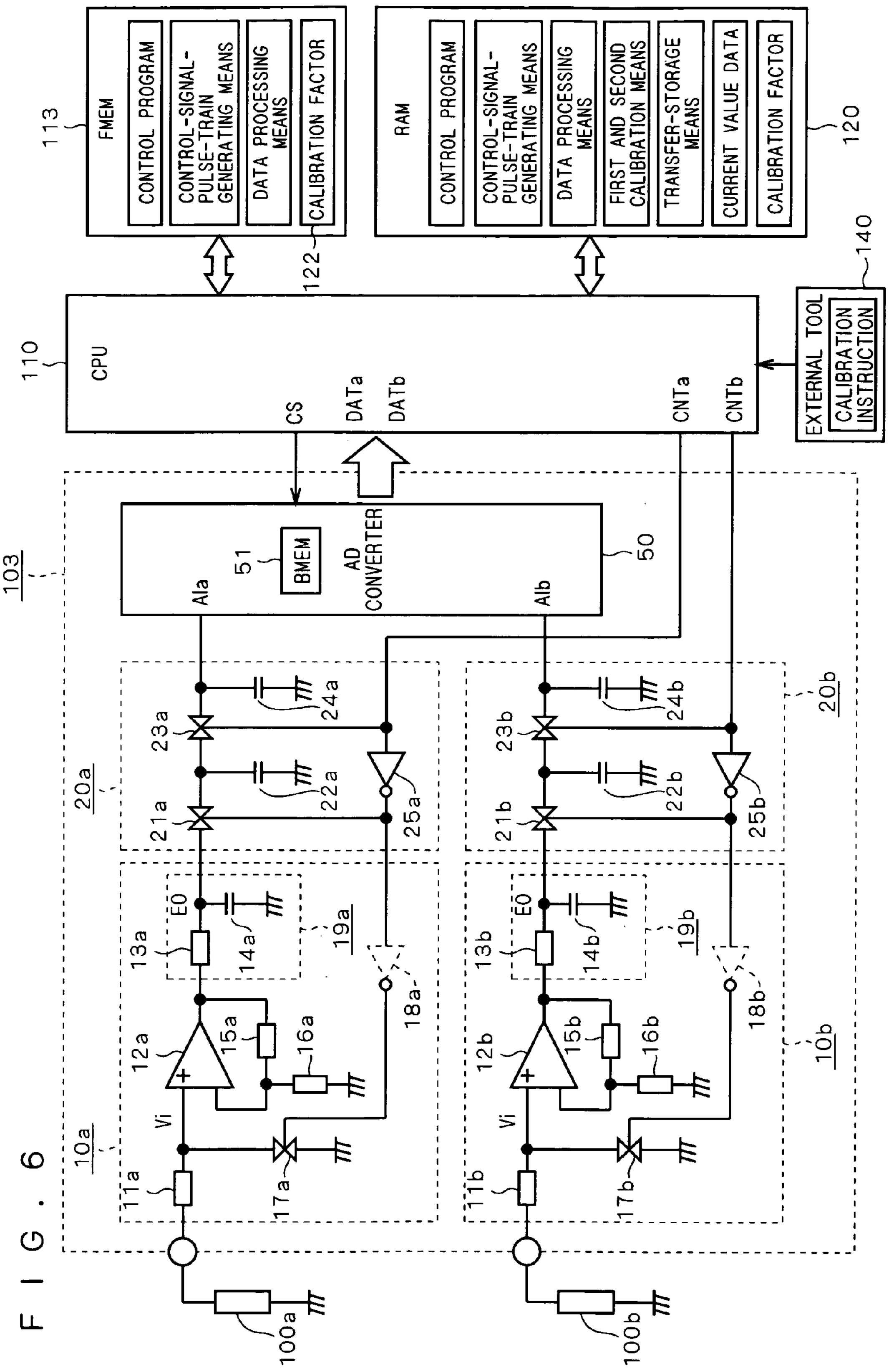
FIG. 6 is a circuit diagram of a signal processor according to a third preferred embodiment of the invention.

FIG. 6 is a circuit diagram of a signal processor according to the present embodiment. The following discussion of the signal processor shown in FIG. 6 is focused on differences from that shown in FIG. 1. First, in the signal processor shown in FIG. 6, an analog input signal processor 103 is provided between the variable analog signal sources 100*a*, 100*b* and the microprocessor 110. The analog input signal processor 103 is formed by the gain control circuits 10*a*, 10*b*, switched capacitor filter circuits 20*a*, 20*b* each constituting a low-pass filter circuit and an AD converter 50 serving as a data converter. The signal voltages from the analog signal sources 100*a* and 100*b* are converted to digital form at the AD converter 50 and are input to the microprocessor 110.

The gain control circuits 10*a*, 10*b* and switched capacitor filter circuits 20*a*, 20*b* are the same as those shown in FIG. 1. However, the AD converter 50 is provided in place of the analog comparator circuits shown in FIG. 1. This AD converter 50 is a multi-channel AD converter for converting a plurality of analog input signals to digital form and storing them successively in a buffer memory 51, and supplies either digital converted data DATa or DATb to the microprocessor 110 based on a chip select signal CS generated by the microprocessor 110. The microprocessor 110 stores the supplied digital converted data DATa or DATb in the RAM memory 120.

Programs serving as the control-signal-pulse-train generating means and data processing means temporarily stored in the RAM memory 120 at the time when the calibration operation is completed, a communication program with the external tool 140 not shown, a control program depending on applications of the microprocessor 110 and the like are stored in a non-volatile program memory 113 (such as a flash memory) bus-connected to the microprocessor 110. Further, calibration factors are to be transferred to and written in some regions of the non-volatile program memory 113.

Various types of programs necessary for the calibration operation are temporarily transferred from the external tool 140 to the RAM memory 120 for arithmetic operation bus-connected to the microprocessor 110 in accordance with a boot program stored in a mask ROM memory not shown, and some of the programs are transferred to the non-volatile program memory 113 at the time when the calibration operation is completed.

The programs transferred to the RAM memory 120 include a communication program with the external tool 140 not shown, a control program depending on applications of the microprocessor 110 and the like in addition to programs serving as the control-signal-pulse-train generating means, data processing means, first and second calibration means and transfer-storage means.

In the calibration operation, the external tool 140 serial-connected to the microprocessor 110 is configured to transmit the first and second calibration instructions to the microprocessor 110. After the calibration operation is completed, and the above-mentioned various types of programs and calibration factors are transferred to and stored in the non-volatile program memory 113, the microprocessor 110 operates in accordance with the various types of programs and calibration factors written and stored in the non-volatile program memory 113 at normal stages thereafter.

Since the first and second calibration means and the transfer-storage means for calibration factors among the various types of programs transferred from the external tool 140 and temporarily stored in the RAM memory 120 are required only in the calibration operation, and therefore, does not need to be transferred to and stored in the non-volatile program memory 113 at the time when the calibration operation is completed. However, in the case where the need to perform the calibration operation arises again at a later date in performing maintenance, the first and second calibration means if having been transferred to and stored in the non-volatile program memory 113 and transfer-storage means can be used only by transferring them from the non-volatile program memory 113 to the RAM memory 120 without transferring them from the external tool 140 to the RAM memory 120.

Although the present embodiment has the above described configuration in which the programs serving as the first and second calibration means and the like are stored in the RAM memory 120, this is only an illustrative example, and the configuration described in the first preferred embodiment may be employed.

Figure 7:
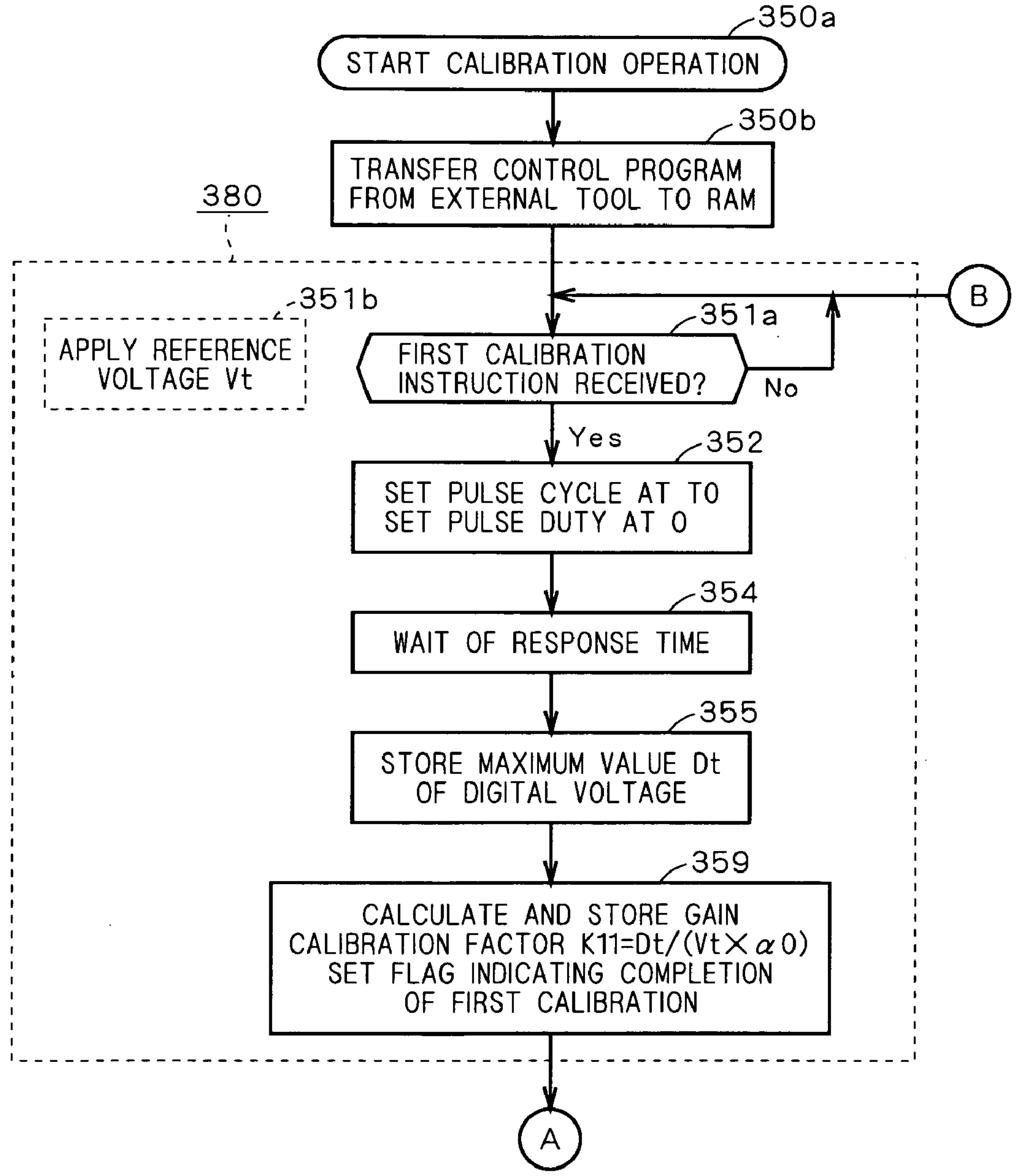
FIGS. 7 through 10 are flow charts of a calibration operation of the signal processor according to the third preferred embodiment.
Figure 8:
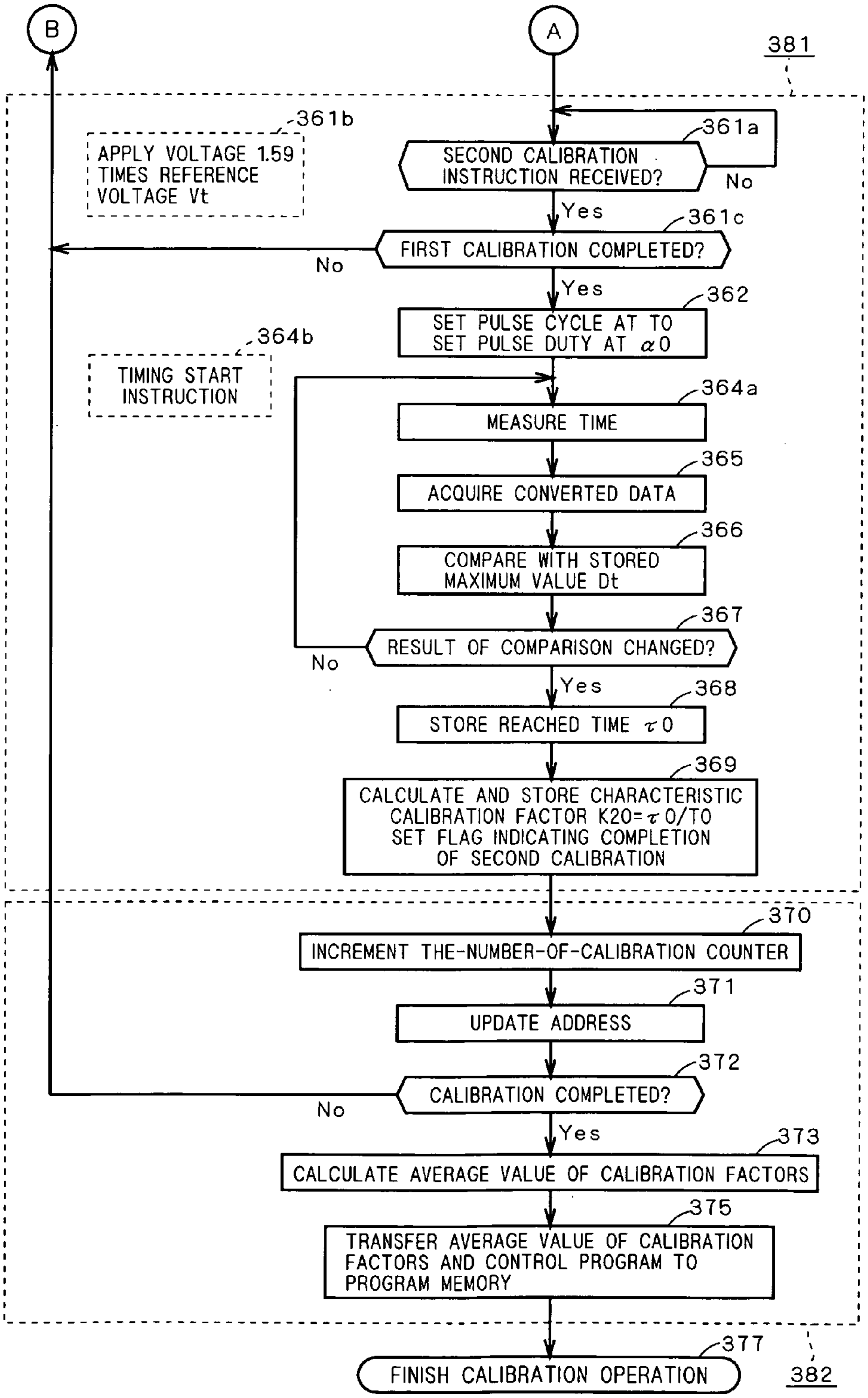

Next, a calibration operation of the signal processor according to the present embodiment will be discussed. FIGS. 7 and 8 are flow charts of the calibration operation of the signal processor according to the present embodiment. First, in the flow chart shown in FIG. 7, the calibration operation is started by supplying power to the microprocessor 110 in a step 350*a*. In the subsequent step 350*b*, the whole control program is transferred from the external tool 140 to the RAM memory 120 to be stored therein in accordance with a boot program not shown. Thereafter, the microprocessor 110 operates in accordance with the control program written in the RAM memory 120.

In a step 351*a* subsequent to the step 350*b*, it is judged whether the first calibration instruction has been received from the external tool 140, and when the first calibration instruction has not been received, the step 351*a* is repeated to wait until the first calibration instruction is received. Before the external tool 140 transmits the first calibration instruction, a calibration-specific signal source is connected to the signal processor according to the present embodiment in place of the variable analog signal source 100*a* as shown in a block 351*b*. The calibration-specific signal source sets the calibration-specific reference voltage Vt at, for example, 3.15V which corresponds to 63% of the maximum input voltage 5V, and is applied to the gain control circuit 10*a*.

When it is judged YES in the step 351*a* upon receipt of the first calibration instruction, a practical average value of the pulse cycle Ta of the control signal pulse train CNTa is set at a representative value T0, and the pulse duty is set at $\alpha 0$=0.5, for example, as a standard value. In this case, the maximum value Dt of a detected digital voltage at the AD converter 50 read by the microprocessor 110 is expressed by the following equation (9) based on the equation (2).

$$Dt=Ga\times\alpha 0\times Vt \tag{9}$$

Assuming that the design theoretical value of the gain Ga is 2, Dt is 3.15V based on the expression (9) if the pulse duty $\alpha 0$=0.5 and the calibration-specific reference voltage Vt=3.15V. Actually, however, the gain Ga does not agree with the design theoretical value in some cases. Therefore, an actual gain Ga is reversely calculated from the maximum value Dt of the detected digital voltage as measured, and the obtained value is determined as the gain calibration factor K11. That is, the gain calibration factor K11 is calculated from the following equation (10) based on the maximum value Dt of the detected digital voltage obtained in the case where the calibration-specific reference voltage Vt is applied.

$$K11=Ga=Dt/(Vt\times\alpha 0) \tag{10}$$

Once the gain calibration factor K11 is obtained, the maximum value Dt of the detected digital voltage is obtained based on the gain calibration factor K11. In the case where the signal voltage is Vi, for example, the maximum value Dt of the detected digital voltage at the AD converter 50 read by the microprocessor 110 is obtained by the following expression (11).

$$Dt=K11\times\alpha\times Vi \tag{11}$$

In a step 354 subsequent to the step 352, there is a long wait sufficiently greater than the integration time constant 1*a* of the switched capacitor filter circuit 20*a*, and in the subsequent step 355, the maximum value Dt of the detected digital voltage at the AD converter 50 read by the microprocessor 110 is written and stored in the RAM memory 120. In a step 359 subsequent to the step 355, the gain calibration factor K11 shown by the equation (10) is calculated and stored based on the maximum value Dt of the detected digital voltage stored in the step 355, the pulse duty $\alpha 0$ defined in the step 352 and the calibration-specific reference voltage Vt of a known value. Then, a flag indicating the completion of the first calibration operation based on the first calibration instruction is set.

Upon receipt of the setting of the flag by the step 359, the external tool 140 multiplies the voltage of the calibration-specific signal source by 1.59 through control means not shown to be set at 5.0V, and then transmits the second calibration instruction. In a step 361*a* shown in FIG. 8 executed subsequently to the step 359, it is judged whether the second calibration instruction has been received from the external tool 140, and when the second calibration instruction has not been received, the step 361*a* is repeated to wait until the second calibration instruction is received.

When it is judged YES in the step 361*a* upon receipt of the second calibration instruction, the operation of the flag selected in the step 359 is monitored in a step 361*c*. It is judged whether the first calibration operation has been completed by the monitoring in the step 361*c*, and when the calibration has not been completed, the process goes back to the step 351*a*, and when the calibration has been completed, the process proceeds into a step 362. In the step 362, a practical average value of the pulse cycle Ta of the control signal pulse train CNTa is set at a representative value T0, and the pulse duty $\alpha$ is set at $\alpha 0$ as defined in the step 352.

In a step 364*a* subsequent to the step 362, an elapsed time since the above-described calibration voltage of 5.0V is applied is measured based on the timing start instruction from the external tool 140 as shown in a block 364*b*. In the subsequent step 365, the detected digital voltage which is a digital converted value at the AD converter 50 is taken into the microprocessor 110. In the next step 366, the maximum value Dt of the detected digital voltage stored in the step 355 is compared with the detected digital voltage read in the step 365. In the subsequent step 367, it is judged whether the result of comparison has changed, and when there is no change in the result of comparison, the process goes back to the step 364*a* to continue timing, and when the result of comparison has changed, the process proceeds into a step 368, where a currently timed value in the step 364*a* is stored as a reached time $\tau 0$.

Since the voltage of the calibration-specific signal source is set at 1.59 times 3.15V applied in the first calibration, the maximum value Dt of the detected digital voltage read by the microprocessor 110 is 1.59 times that in the first calibration. On the other hand, the standard reference voltage in the step 366 is equal to the maximum value Dt of the detected digital voltage stored in the step 355, which corresponds to 63% of the value obtained by multiplying the maximum value Dt by 1.59. Accordingly, the reached time $\tau 0$ corresponds to the integration time constant of the switched capacitor filter circuit 20*a*.

In a step 369 subsequent to the step 368, the integration time constant $\tau 0$ stored in the step 368 is divided by the pulse cycle T0 set in the step 363, and the resultant quotient is stored as the filter characteristic calibration factor K20. Then, a flag indicating the completion of the second calibration based on the second calibration instruction is set. Substituting the integration time constant $\tau 0$ and the pulse cycle T0 both measured in the above calibration operation into the equation (3), (C24*a*/C22*a*) assumed to fluctuate is obtained by the equation (7). Substituting the relation expressed by the equation (7) into the equation (3) again, the integration time constant Ta when the pulse cycle is Ta is obtained as the equation (8). A 1.59-times calibration voltage is applied in the block 361*b*, however, the applied voltage may be Vt the same as in the first calibration operation, and the pulse duty at in the step 362 may be multiplied by 1.59.

In a step 370 subsequent to the step 369, the-number-of-calibration counter is incremented, and in the subsequent step 371, addresses at which the calibration factors K11 and K20 obtained in the steps 359 and 369, respectively, are stored are updated. In the subsequent step 372, it is judged whether a predetermined number of calibrations have been completed, and when the predetermined number of calibrations have not been completed, the process goes back to the step 351*a* to start the calibration operation again, and when the predetermined number of calibrations have been completed, the process proceeds into a step 373. In the step 373, a statistic value such as an average, mode or median of a plurality of gain calibration factors K10 and that of a plurality of filter characteristic calibration factors K20 stored in the RAM memory 120 are calculated and stored in the RAM memory 120 at the addresses updated in the step 371. In the subsequent step 375, the calibration factors K11 and K20 calculated and stored in the step 373 are transferred to and stored in a data memory region 122 of the non-volatile program memory 113, and the various types of control programs transferred from the external tool 140 to the RAM memory 120 in the step 350*b* are also transferred to and stored in the program memory 113. Then, the process proceeds into a step 377, where the calibration operation is completed.

Summarizing the above-described calibration operation, a process block 380 including the steps 351*a* to 359 serves as the first calibration means for causing the microprocessor 110 to read the maximum value Dt of the detected digital voltage at the AD converter 50 using the calibration-specific signal source having a known voltage, thereby calculating the gain calibration factor K11.

A process block 381 including the steps 361*a* to 369 serves as the second calibration means for monitoring variations in the detected digital voltage at the AD converter 50 using the calibration-specific signal source having the known voltage Vt, thereby calculating the filter characteristic calibration factor K20. A process block 382 including the steps 370 to 375 serves as the transfer-storage means, and the step 372 serves as the repetitive calibration means. In the transfer-storage means according to the present embodiment, an abnormality judgment as to whether or not the calibration factors fall within an allowable numerical range may be performed, as in the first preferred embodiment.

Although FIGS. 7 and 8 describe the calibration operation for the gain control circuit 10*a*, switched capacitor filter circuit 20*a* and AD converter 50, a similar calibration operation is performed for the gain control circuit 10*b*, switched capacitor filter circuit 20*b* and AD converter 50.

Figure 9:
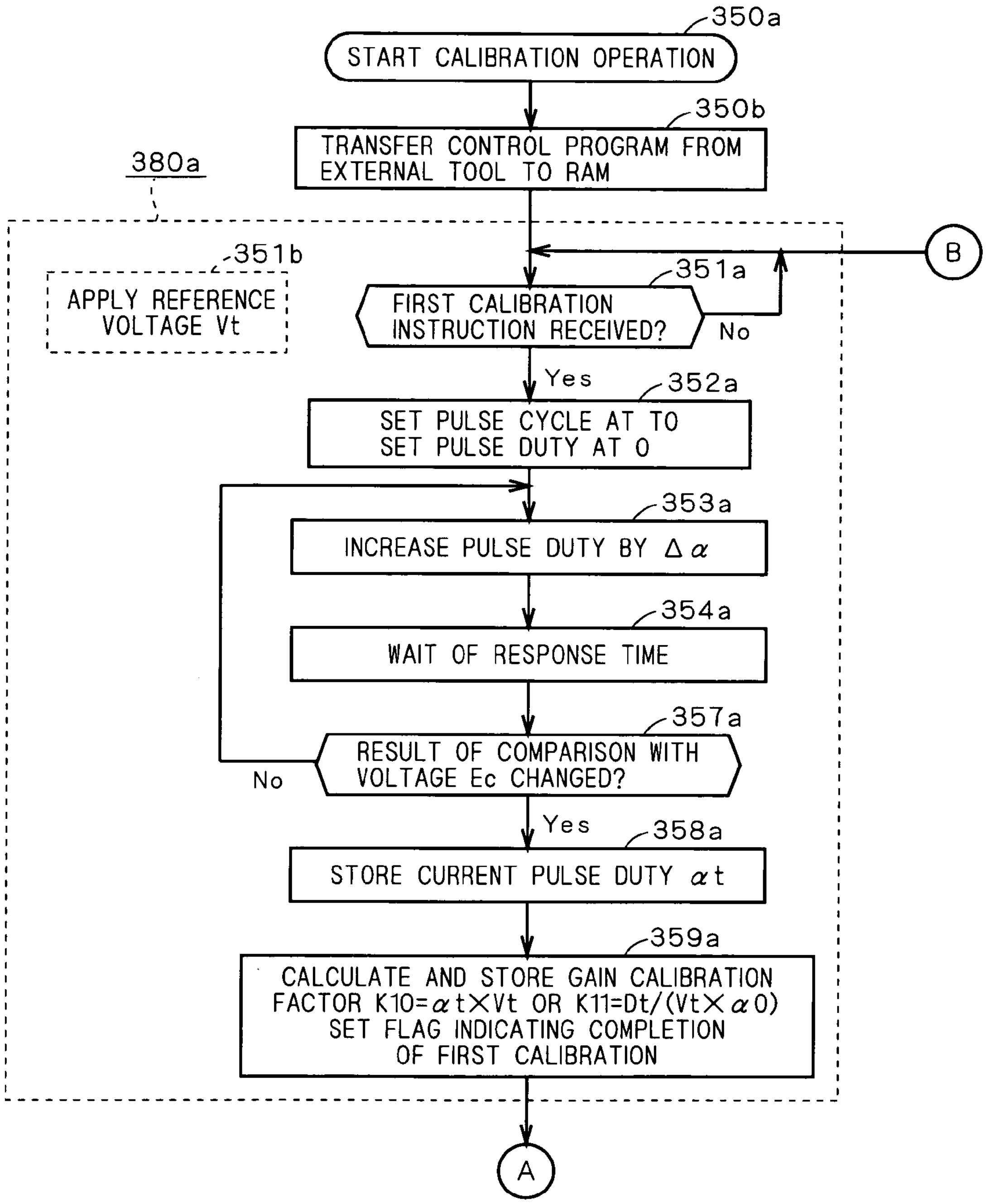
Figure 10:
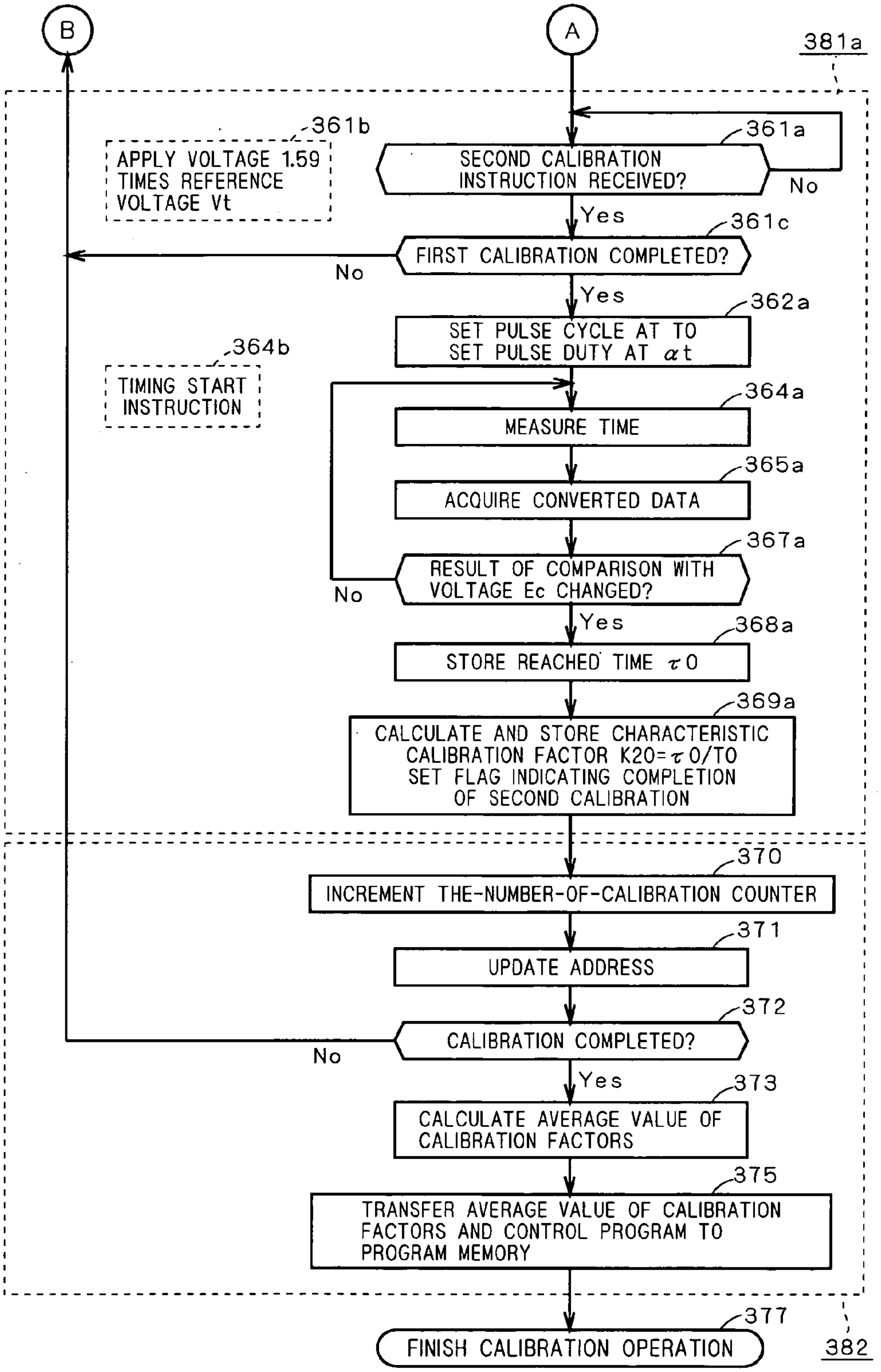

FIGS. 9 and 10 show flow charts of the calibration operation as alternative means to that shown in FIGS. 7 and 8. In the present embodiment, unlike the first preferred embodiment, the microprocessor 110 performs a digital comparison instead of the analog comparator circuits 30*a* and 30*b*, and therefore, a standard reference digital voltage Ec is stored in the program memory 113 as an alternative to the standard reference voltages 31*a* and 31*b* described in the first preferred embodiment.

Referring to FIG. 9, the calibration operation is started by supplying power to the microprocessor 110 in the step 350*a*. In the next step 350*b*, the whole control program is transferred to and stored in the RAM memory 120 from the external tool 140 in accordance with a boot program not shown. Thereafter, the microprocessor 110 operates in accordance with the control program written in the RAM memory 120. In the step 351*a* subsequent to the step 350*b*, it is judged whether the first calibration instruction has been received from the external tool 140, and when the first calibration instruction has not been received, the step 351*a* is repeated to wait until the first calibration instruction is received.

Before the external tool 140 transmits the first calibration instruction, a calibration-specific signal source is connected to the signal processor according to the present embodiment in place of the variable analog signal source 100*a* as shown in the block 351*b*. For instance, the calibration-specific reference voltage Vt of 3.15V is applied to the gain control circuit 10*a*. This calibration-specific reference voltage Vt is determined by the following procedure. For instance, assuming that the standard reference digital voltage Ec=3.15V, the pulse duty $\alpha\mathbf{0}$=0.5 and the design theoretical value of the gain Ga=2, the calibration-specific reference voltage Vt is calculated by 3.15=(2×0.5)×3.15 in accordance with the relation shown in the expression (2).

Assuming that an actual product has the pulse duty $\alpha\mathbf{0}$=0.5, standard reference voltage Vc=3.15V and gain Ga=2.0 as design theoretical values and applying the signal voltage Vi of 3.15V, the saturation output voltage of the switched capacitor filter circuit 20*a* is judged to agree with the standard reference digital voltage Ec as a result of digital comparisons made by the microprocessor 110. However, if there is an error in the gain Ga in an actual product, the pulse duty $\alpha\mathbf{0}$=0.5 does not allow the saturation output voltage of the switched capacitor filter circuit 20*a* to agree with the standard reference digital voltage Ec. Thus, a pulse duty $\alpha t$ at which the saturation output voltage of the switched capacitor filter circuit 20*a* agrees with the voltage Ec is necessary to be searched for.

When the first calibration instruction is received, it is judged YES in the step 351, and in a step 352*a*, a practical average value of the pulse cycle Ta of the control signal pulse train CNTa is set at the representative value T0, and the pulse duty $\alpha$ is set at 0. In the subsequent step 353*a*, the pulse duty is slightly increased by $\Delta$a from the present state. In the subsequent step 354, there is a long wait sufficiently greater than the integration time constant $\tau$a of the switched capacitor filter circuit 20*a*. In the subsequent step 357*a*, it is judged whether the result of digital comparison made by the microprocessor 110 has changed. When there is no change, the process goes back to the step 353*a*, where the pulse duty is further increased slightly, and when there is a change, the process proceeds into a step 358*a*, where the pulse duty $\alpha t$ at the time of change is stored.

In a step 359*a* subsequent to the step 358*a*, the calibration factor K11 is calculated and stored based on the pulse duty at stored in the step 358*a*, the calibration-specific reference voltage Vt of a known value and the standard reference digital voltage Ec. The calibration factor K11 is the gain Ga assumed to fluctuate and is obtained by the following equation (5a).

$$Ga=Ec/(Vt\times\alpha t)=K11 \tag{5a}$$

Representing the equation (4) using the calibration factor K11 defined by the equation (5a), the following equation (6a) is obtained. Storing Ec/K 1=Vt×at =K10 as the calibration factor instead of using the calibration factor K11 in the equation (6a), the equation (6a) is the same as the equation (6) described in the first preferred embodiment.

$$Vi=Ec/(K11\times\alpha) \tag{6a}$$

The equation (6a) shows that the signal voltage Vi that causes the saturation output voltage of the switched capacitor filter circuit 20*a* to agree with the standard reference digital voltage Ec is variable depending on the pulse duty $\alpha$.

Further, in the step 359*a*, a flag indicating the completion of the first calibration based on the first calibration instruction is set.

Upon receipt of the setting of the flag in the step 359*a*, the external tool 140 multiplies the voltage of the calibration-specific signal source by 1.59, for example, through control means not shown to be set at 5.0V, and then transmits the second calibration instruction. In a step 361*a* shown in FIG. 10 executed subsequently to the step 359*a*, it is judged whether the second calibration instruction has been received from the external tool 140, and when the second calibration instruction has not been received, the process goes back to the step 361*a* to wait until the second calibration instruction is received.

When it is judged YES in the step 361*a* upon receipt of the second calibration instruction, the process proceeds into a step 361*c*. In the step 361*c*, it is judged whether the first calibration has been completed by monitoring the operation of the flag set in the step 359. When the first calibration has not been completed, the process goes back to the step 351*a*, and when the first calibration has been completed, the process proceeds into a step 362*a*. In the step 362*a*, a practical average value of the pulse cycle Ta of the control signal pulse train CNTa is set at the representative value T0, and the pulse duty a is set at the value αt stored in the step 358*a*.

In a step 364*a* subsequent to the step 362*a*, an elapsed time since the above-mentioned calibration voltage of 5.0V is applied based on a timing start instruction from the external tool 140 as shown in a block 364*b* is measured. In the subsequent step 365*a*, digital converted data obtained by the AD converter 50 is taken into the microprocessor 110. In the subsequent step 367*a*, it is judged whether the result of digital comparison with the standard reference digital voltage Ec performed by the microprocessor 110 has changed, and when there is no change in the result of digital comparison, the process goes back to the step 364*a* to continue timing, and when the result of digital comparison has changed, the process proceeds into a,step 368*a*, where a currently timed value obtained in the step 364*a* is stored as a reached time T0.

The voltage of the calibration-specific signal source is 1.59 times the value 3.15V applied in the first calibration. Thus, the saturation output voltage of the switched capacitor filter circuit 20*a* is 1.59 times the standard reference digital voltage Ec of 3.15V. Since 63% of 5.0V obtained by multiplying the standard reference digital voltage of 3.15V by 1.59 is 3.15V, the reached time T0 corresponds to the integration time constant of the switched capacitor filter circuit 20*a*.

In a step 369*a* subsequent to the step 368*a*, the integration time constant T0 stored in the step 368*a* is divided by the pulse cycle T0 set in the step 362*a*, and the resultant quotient is stored as the filter characteristic calibration factor K20, and a flag indicating the completion of the second calibration based on the second calibration instruction is set. Substituting the integration time constant T0 and the pulse cycle T0 both measured in the above-described calibration operation into the equation (3), the variations (C24*a*/C22*a*) assumed to fluctuate is obtained by the equation (7).

Substituting the relation of the equation (7) again into the equation (3), the integration time constant τa when the pulse cycle is Ta is obtained as the equation (8). Although the 1.59-times calibration voltage is applied in the block 361*b*, the voltage Vt the same as in the first calibration operation may be applied, and the pulse duty at in the step 362*a* may be multiplied by 1.59.

In a step 370 subsequent to the step 369*a*, the-number-of-calibration counter is incremented, and in the subsequent step 371, addresses at which the calibration factors K11 and K20 obtained in the steps 359*a* and 369*a*, respectively, are stored are updated. In the subsequent step 372, it is judged whether a predetermined number of calibrations have been completed, and when the predetermined number of calibrations have not been completed, the process goes back to the step 351*a* to start a calibration operation again, and when the predetermined number of calibrations have been completed, the process proceeds into the step 373.

In the step 373, a statistic value such as an average, mode or median of a plurality of gain calibration factors K10 or K11 and that of a plurality of filter characteristic calibration factors K20 stored in the RAM memory 120 are calculated and stored in the RAM memory 120 at the addresses updated in the step 371. In the subsequent step 375, the calibration factor K10 or K11 and K20 calculated and stored in the step 373 are transferred to and stored in the data memory region 122 of the program memory 113, and the various types of control programs transferred from the external tool 140 to the RAM memory 120 in the step 350*b* are also transferred to and stored in the program memory 113. Then, the process proceeds into a step 377, where the calibration operation is completed.

Although being set at 0 in the step 352*a*, the pulse duty α may be set at 1, for example, and may be slightly reduced in the subsequent step 353*a*. Further, in performing a plurality of calibration operations, the voltage of the calibration-specific signal source may be varied intentionally in each of a plurality of calibration operations so as to perform measured calibrations widely applicable to practical use.

Summarizing the above-described calibration operation, a process block 380*a* including the steps 351*a* to 359*a* serves as the first calibration means for calculating the gain calibration factor K10 or K11 while monitoring the output voltage of the AD converter 50 with the microprocessor 110 using the calibration-specific signal source having a known voltage.

A process block 381*a* including the steps 361*a* to 369*a* serves as the second calibration means for calculating the filter characteristic calibration factor K20 while monitoring the output voltage of the AD converter 50 with the microprocessor 110 using the calibration-specific signal source having a known voltage. The process block 382 including the steps 370 to 375 serves as the transfer-storage means, and the step 372 serves as the repetitive calibration means. In the transfer-storage means according to the present embodiment, an abnormality judgment may be performed as to whether or not the calibration factors fall within an allowable numerical range, as in the first preferred embodiment.

Although FIGS. 9 and 10 describe the calibration operation for the gain control circuit 10*a*, switched capacitor filter circuit 20*a* and AD converter 50, a similar calibration operation is performed for the gain control circuit 10*b*, switched capacitor filter circuit 20*b* and AD converter 50.

As is apparent from the above description, the signal processor according to the present embodiment includes the AD converter 50 serving as a data converter, different from the first preferred embodiment. The AD converter 50 converts the signal voltages obtained through the switched capacitor filter circuits 20*a*, 20*b* and gain control circuits 10*a*, 10*b* into the digital converted data DATa, DATb, respectively, and inputs them to the microprocessor 110. The digital converted data DATa and DATb are written into the RAM memory 120 serving as a detected data memory through the microprocessor 110.

Further, in the signal processor according to the present embodiment, the AD converter 50 serves as a data converter, and the microprocessor 110 further includes the data processing means for changing the pulse duties of the control signal pulse trains CNTa and CNTb to change the input/output ratios of the gain control circuits 10*a* and 10*b*, respectively, thereby equivalently changing the standard reference digital voltage and comparing the detected digital voltage at the AD converter 50 with the standard reference digital voltage to output the results of comparison as digital logic signals. Therefore, the microprocessor 110 can calculate a deviate between the detected digital voltage as supplied and the standard reference digital voltage. Even in the case of operating the signal processor with the standard reference digital voltage set at a relatively great value, the amplification factors of the gain control circuits 10*a* and 10*b* are increased, which apparently corresponds to setting the standard reference digital voltage at an equivalently small value. This can achieve an improved digital conversion accuracy of the AD converter 50 avoiding the usage of a low-power region.

Furthermore, in the signal processor according to the present embodiment, the AD converter 50 is a multi-channel AD converter for digitally converting in succession the signal voltages supplied from the plurality of variable analog signal sources 100*a* and 100*b*. Accordingly, since one control signal is input to each of the variable analog signal sources 100*a* and 100*b*, input signals to the microprocessor 110 and the variable analog signal sources 100*a*, 100*b* are equal in number, which means many variable analog signal sources can be connected. Even when signal voltages output from the respective variable analog signal sources 100*a* and 100*b* differ from each other in the maximum value, adjusting the amplification factors of the gain control circuits 10*a* and 10*b* such that the maximum value of the signal voltage from each of the respective variable analog signal sources and the maximum value of voltage input to the AD converter 50 become almost equal can achieve an improved digital conversion accuracy of the AD converter 50.

Still further, in the signal processor according to the present embodiment, the first calibration means 380 detects and stores the maximum value Dt of the detected digital voltage at the AD converter 50 assuming that the voltage of the calibration-specific signal source is Vt and the pulse duty is set at the representative value aO, thereby calculating the gain calibration factor $K11=Dt/(Vt\times\alpha 0)$. After the first calibration means 380, the second calibration means 381 measures the time t elapsed from the connection of the calibration-specific signal source to the increase in the signal voltage to reach the maximum value Dt of the detected digital voltage stored in the first calibration means 380 assuming that the voltage of the calibration-specific signal source is greater than the voltage Vt applied in the first calibration means 380 (e.g., 1.59 times the voltage Vt) and the pulse duty is $\alpha 0$ as set in the first calibration means 380, thereby calculating the integration time constant $\tau 0$ of the low-pass filter and then calculating the filter characteristic calibration factor $K20=T0/T0$ with respect to the pulse cycle T0 of the control signal pulse train at the time of calibration.

As described, the first calibration means 380 previously calibrates the gain characteristics, so that the signal processor according to the present embodiment can calibrate the integration time constant of the low-pass filter accurately and effectively using known gain characteristics as measured and stored. Further, even if the conversion characteristics fluctuate from product to product, the signal processor according to the present embodiment can calibrate the whole gain including such fluctuations.

Furthermore, in the signal processor according to the present embodiment, the first calibration means 380*a* as different calibration means detects the comparison-agreement pulse duty $\alpha t$ at which the result of digital comparison between the voltage Vt of the calibration-specific signal source and the standard reference digital voltage Ec changes while gradually increasing or decreasing the pulse duty of the control signal pulse train supplied to the gain control circuits, thereby calculating the gain calibration factor $K10=\alpha t\times Vt$ or $K11=Ec/(Vt\times\alpha t)$. After the first calibration means 380*a*, the second calibration means 381*a* measures the time t elapsed from the connection of the calibration-specific signal source to the increase in the signal voltage to reach the standard reference digital voltage Ec applied in the first calibration means 380*a* assuming that the voltage of the calibration-specific signal source is greater than the voltage Vt applied in the first calibration means 380*a* (e.g., 1.59 times the voltage Vt) and the pulse duty is set at $\alpha t$ as detected in the first calibration means 380*a*, thereby calculating the integration time constant $\tau 0$ of the low-pass filter and then calculating the filter characteristic calibration factor $K20=\tau 0/T0$ with respect to the pulse cycle T0 of the control signal pulse train at the time of calibration.

As described, the first calibration means 380*a* previously calibrates the gain characteristics, so that the signal processor according to the present embodiment can calibrate the integration time constant of the low-pass filter accurately and effectively using known gain characteristics as measured and stored. Further, even if the digital conversion characteristics fluctuate from product to product, the signal processor according to the present embodiment can calibrate the whole gain including such fluctuations.

Fourth Preferred Embodiment

Figure 11:
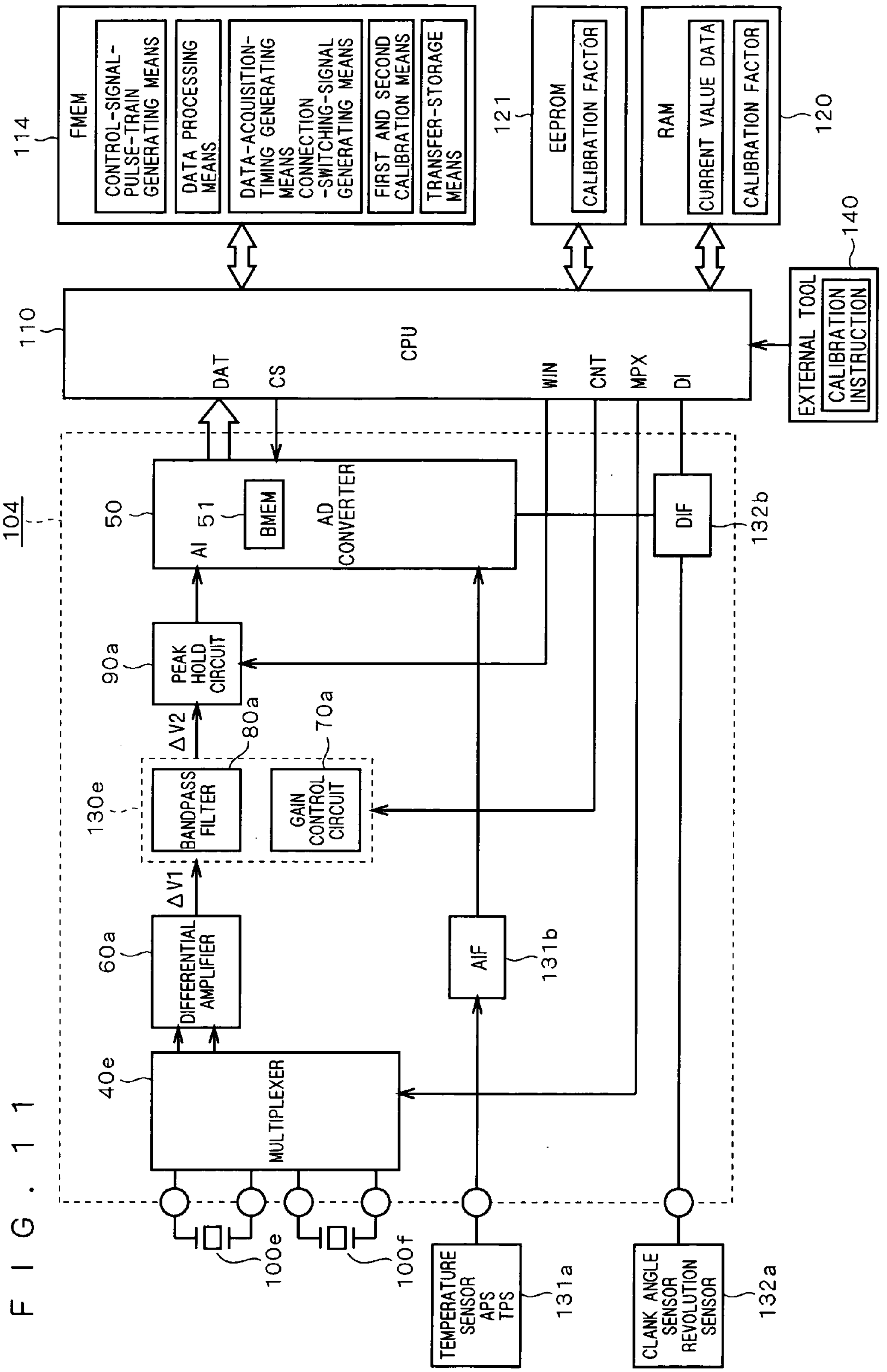
FIGS. 11 and 12 are circuit diagrams of a signal processor according to a fourth preferred embodiment of the invention.

FIG. 11 is a circuit diagram of a signal processor according to the present embodiment. The signal processor according to the present embodiment will be discussed in reference to FIG. 11. In FIG. 11, an analog input signal processor 104 is provided between variable analog signal sources 100*e*, 100*f* serving as knock sensors for detecting vibrations created by an engine, for example, and the microprocessor 110 constituting an engine control device. The variable analog signal sources 100*e* and 100*f* generate pulsation signals.

In the analog input signal processor 104 shown in FIG. 11, a multiplexer 40*e*, a differential amplifier 60*a*, a circuit block 130*e* including a gain control circuit 70*a* and a band-pass filter circuit 80*a*, a peak hold circuit 90*a* and the AD converter 50 are connected in this order. Here, the band-pass filter circuit 80*a* is formed by a switched capacitor filter circuit.

Δn analog sensor 131*a* is a group of sensors including a temperature sensor (such as a cooling-water temperature sensor and an outside-air temperature sensor of an engine), an accelerator position sensor (APS), a throttle position sensor (TPS) and the like. An analog input signal from the analog sensor 131*a* is input to an analog input terminal of the multi-channel AD converter 50 through an interface circuit (AIF) 131*b*, and is successively converted into digital form to be stored in the buffer memory 51. A switching sensor 132*a* is a group of sensors for performing various types of ON/OFF operations such as a clank angle sensor and a revolution sensor of an engine, and is connected to an input port DI of the microprocessor 110 through an interface circuit (DIF) 132*b*.

The microprocessor 110 discriminatingly reads many pieces of digital converted data stored in the buffer memory 51 in response to a chip select signal CS to transfer them to the RAM memory 120 and supplies an acquisition timing signal WIN to the peak hold circuit 90*a*. Further, the microprocessor 110 supplies a connection switching signal MPX to the multiplexer 40*e* and a control signal pulse train CNT to the gain control circuit 70*a* and band-pass filter circuit 80*a*.

A non-volatile program memory 114 (such as a flash memory) bus-connected to the microprocessor 110 stores a communication program with the external tool 140 not shown, a control program depending on applications of the microprocessor 110 for engine control and the like in addition to programs serving as control-signal-pulse-train generating means, data processing means, data-acquisition-timing generating means, connection-switching-signal generating means, first and second calibration means and transfer-storage means.

Digital converted values of various types of analog input signals digitally converted by the AD converter 50, calibration factors calculated by a calibration operation are written into the RAM memory 120 for arithmetic operation bus-connected to the microprocessor 110. Calibration factors transferred from the RAM memory 120 obtained by calibrations performed by the first and second calibration means to be described later are stored in the non-volatile data memory 120 such as an EEPROM memory bus-connected or serial-connected to the microprocessor 110. The external tool 140 to be serial-connected to the microprocessor 110 when performing a calibration operation is configured to transmit the first and second calibration instructions to the microprocessor 110.

Figure 12:
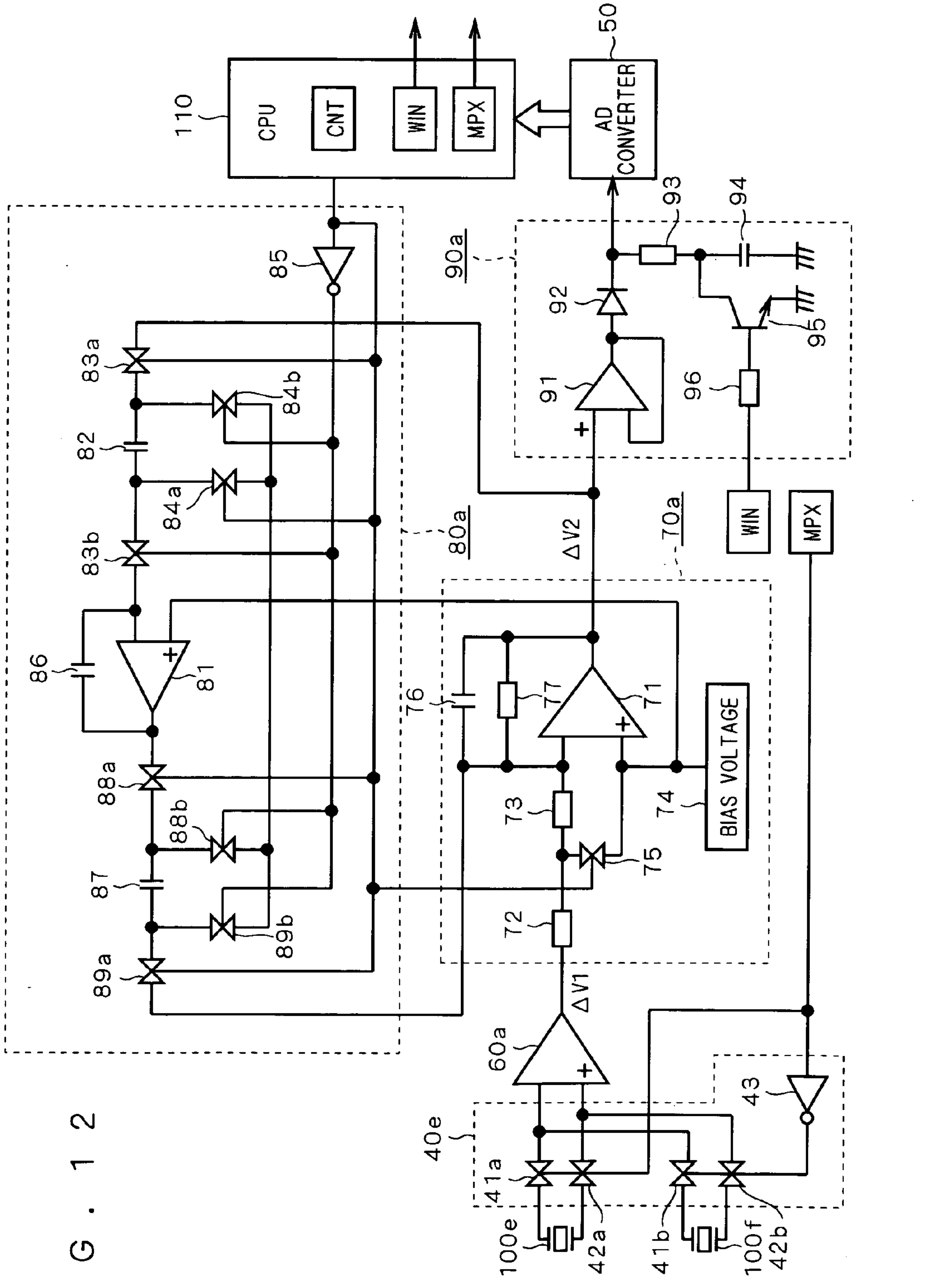

FIG. 12 is a circuit diagram of the analog input signal processor 104 according to the present embodiment. As shown in FIG. 12, the multiplexer 40*e* includes selective switching devices 41*a*, 42*a* for connecting the variable analog signal source 100*e* and differential amplifier 60*a*, selective switching devices 41*b*, 42*b* for connecting the variable analog signal source 100*f* and differential amplifier 60*a*, and an inverter 43. The selective switching devices 41*a* and 42*a* conduct when the connection switching signal MPX generated by the microprocessor 110 is in the logical level of "H", while the selective switching devices 41*b* and 42*b* driven through the inverter 43 conduct when the connection switching signal MPX is in the logical level of "L".

An amplifier 71 provided in the gain control circuit 70*a* has its reverse input terminal connected to the output terminal of the differential amplifier 60*a* through input resistors 72 and 73, and a bias voltage 74 of, e.g., DC 2.5V is applied to the non-reverse input terminal of the amplifier 71. An amplification-factor-adjusting switching device 75 is connected between the non-reverse input terminal of the amplifier 71 and the junction between the input resistors 72 and 73. An integration capacitor 76 and a feedback resistor 77 are connected in parallel between the output terminal and reverse-input terminal of the amplifier 71.

The bias voltage 74 is also applied to the non-reverse input terminal of an amplifier 81 provided in the band-pass filter circuit 80*a*, and the reverse input terminal of the amplifier 81 is connected to a charging/discharging capacitor 82. The charging/discharging capacitor 82 is connected between the output terminal of the amplifier 71 and the non-reverse input terminal of the amplifier 81 when switching devices 83*a* and 84*a* conduct, while being connected between the reverse input terminal and non-reverse input terminal of the amplifier 81 when switching devices 83*b* and 84*b* conduct. The amplification-factor-adjusting switching device 75 and switching devices 83*a* and 84*a* are configured to conduct when the control signal pulse train CNT generated by the microprocessor 110 is in the logical level of "H", and the switching devices 83*b* and 84*b* driven through an inverter 85 are configured to conduct when the control signal pulse train CNT is in the logical level of "L".

An integration capacitor 86 is connected between the non-reverse input terminal and output terminal of the amplifier 81. A charging/discharging capacitor 87 is connected between the output terminal of the amplifier 81 and the non-reverse input terminal of the amplifier 71 when switching devices 88*a* and 89*a* conduct, and the both terminals of the charging/discharging capacitor 87 are short-circuited to generate discharge when switching devices 88*b* and 89*b* conduct. The switching devices 88*a* and 89*a* are configured to conduct when the control signal pulse train CNT is in the logical level of "H", and the switching devices 88*b* and 89*b* driven through the inverter 85 are configured to conduct when the control signal pulse train CNT is in the logical level of "L".

An amplifier 91 provided in the peak hold circuit 90*a* has its non-reverse input terminal connected to the output terminal of the amplifier 71 and its output terminal connected to a maximum-value storage capacitor 94 through a backflow prevention diode 92 and a charging resistor 93. The voltage across a series circuit of the capacitor 94 and charging resistor 93 is applied to the microprocessor 110 through the AD converter 50. A transistor 95 serving as a discharge switching device is driven to conduct through a driving resistor 96 when the acquisition timing signal WIN generated by the microprocessor 110 is in the logical level of "H" causing the maximum-value storage capacitor 94 to become shorted to generate discharge. The microprocessor 110 is configured to read the output voltage of the AD converter 50 after a lapse of a predetermined time period since the discharge switching device 95 becomes non-conducting when the acquisition timing signal WIN is brought into the logical level of "L".

Figure 13A:
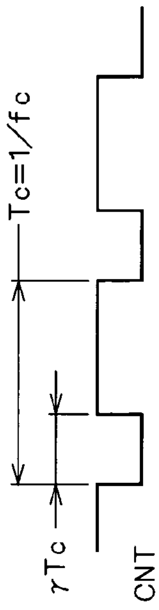
FIGS. 13A and 13B show operational characteristics of the signal processor according to the fourth preferred embodiment.
Figure 13B:
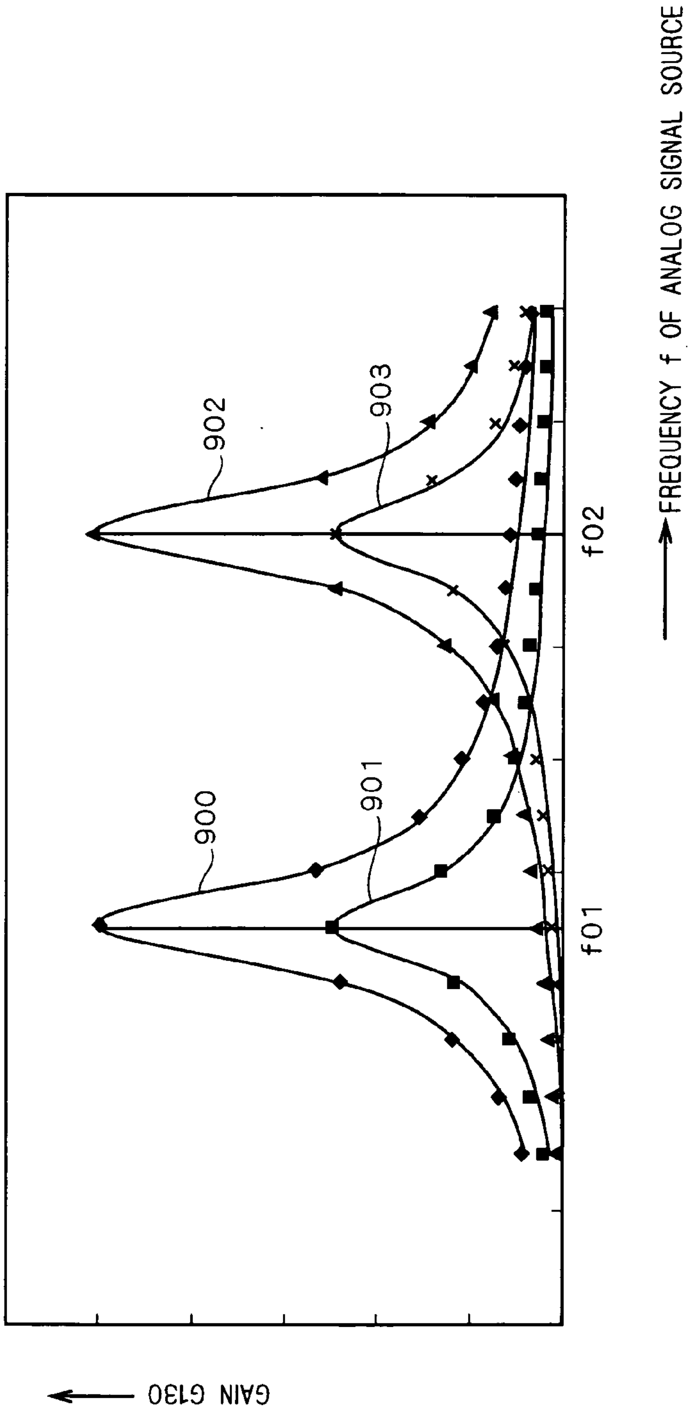

FIGS. 13A and 13B show operations of the signal processor according to the present embodiment. FIG. 13A shows the waveform of the control signal pulse train CNT, whose logical level changes from "L" to "H" in a pulse cycle Tc which is the reciprocal of a pulse frequency fc. A pulse duty γ is defined as a ratio between the cycle Tc and the period in which the logical level is in the "L" state. FIG. 13B shows gain characteristics G130 obtained as an input/output ratio ΔV2/ΔV1 of the whole circuit block 130*e*. Here, ΔV1 indicates a signal voltage input to the circuit block 130*e*, and ΔV2 indicates a signal voltage output from the circuit block 130*e*.

The gain characteristics G130 of the whole circuit block 130*e* can be divided into a gain G70 of the gain control circuit 70*a* and a gain G80 of the band-pass filter circuit 80*a* as shown in the following equation (12). Further, the gains G70 and G80 can be expressed as the following equations (13) and (14), respectively.

$$G130 = G70 \times G80 \tag{12}$$

$$G70 = [R77/(R72 + R73] \times \gamma \tag{13}$$

$$G80 = 1/\sqrt{1 + (f0^2 - f^2)/(fb \times f)\}^2} \tag{14}$$

$$f0 = \sqrt{C82 > C87/(C76 \times C86)} \times fc/(2\pi) \tag{15}$$

$$fb = 1/(2\pi C76 \times R77) \tag{16}$$

Here, R72, R73 and R77 indicate resistance values of the input resistors 72, 73 and feedback resistor 77, respectively; C76 and C86 indicate capacitances of the integration capacitors 76 and 86, respectively; C82 and C87 indicate capacitances of the charging/discharging capacitors 82 and 87, respectively; f0 indicates the center frequency of the variable analog signal sources 100*e* and 100*f* (knock sensors); fb indicates the bandwidth frequency of the variable analog signal sources 100*e* and 100*f*; and f indicates the signal frequency of the variable analog signal sources 100*e* and 10*f*.

As is apparent from the equation (15), the center frequency f0 at which the gain G80 is at the maximum is proportional to the pulse frequency fc of the control signal pulse train CNT, and can be changed to f01 or f02 as shown in FIG. 13B by varying the pulse frequency fc. In FIG. 13B, curves 900 and 901 show gain characteristics obtained by varying the pulse duty y at the center frequency f01, and curves 902 and 903 show gain characteristics obtained by varying the pulse duty y at the center frequency f02. As the pulse duty y varies, the gain G70 also varies as is apparent from the equation (13), and therefore, the gain characteristics G130 increase or decrease in proportion to the pulse duty y.

Although the center frequency f0 is expressed as K80×fc in accordance with the equation (15), a characteristic calibration factor K80 varies depending on fluctuations in the capacitances C76, C82, C86 and C87 of the respective capacitors from one signal processor to another. Therefore, a calibration value of the characteristic calibration factor needs to be measured in each product.

In the case where the frequency f of the variable analog signal source is gradually increased with the pulse frequency fc of the control signal pulse train CNT kept constant, the equation $(f0^2-f1^2)/(fb\times f1)=(f2^2-f0^2)(fb\times f2)$, that is, $(f0^2-f1^2)\times f2=(f2^2-f0^2)\times f1$ holds assuming that the gain G80 of a first frequency f1 and that of a second frequency f2 obtained by the equation (14) are equal to each other where the first frequency f1 and second frequency f2 are present before and after the center frequency f0. In other words, the relations shown by the following expressions (17) hold between the first and second frequencies f1 and f2. In the expressions (17), the geometrical mean (f1×f 2) is almost equal to the arithmetic mean (f1+f2)/2 when f1≈f2.

$$f0=\sqrt{(f1\times f2)}\approx(f1+f2)2$$

$$f1\approx f2 \tag{17}$$

In contrast, in the case where the pulse frequency fc of the control signal pulse train CNT is varied with the frequency f of the variable analog signal source kept at a constant value ft, the center frequencies f01=K80×fc1 and f02=K80×fc2 where fc1 and fc2 are pulse frequencies, which means two types of gains G80 are obtained. Here, provided that the two types of gains G80 are adjusted to be equal to each other at the frequency ft of the variable analog signal source, the relation $(f02^2-ft^2)/(fb\times ft)=(ft^2-f01^2)/(fb\times ft)$ can be induced from the equation (14). That is, the equation $2\ ft^2=f01^2+f02^{2=K802}(fc1^2+fc2^2)$ holds, and the characteristic calibration factor K80 is obtained by the following equation (18).

$$K80=\sqrt{2ft^2(fc1^2+fc2^2)}=ft/fc0 \tag{18}$$

$$fc0=\sqrt{(fc1^2+fc2^2)/2} \tag{19}$$

Figure 14:
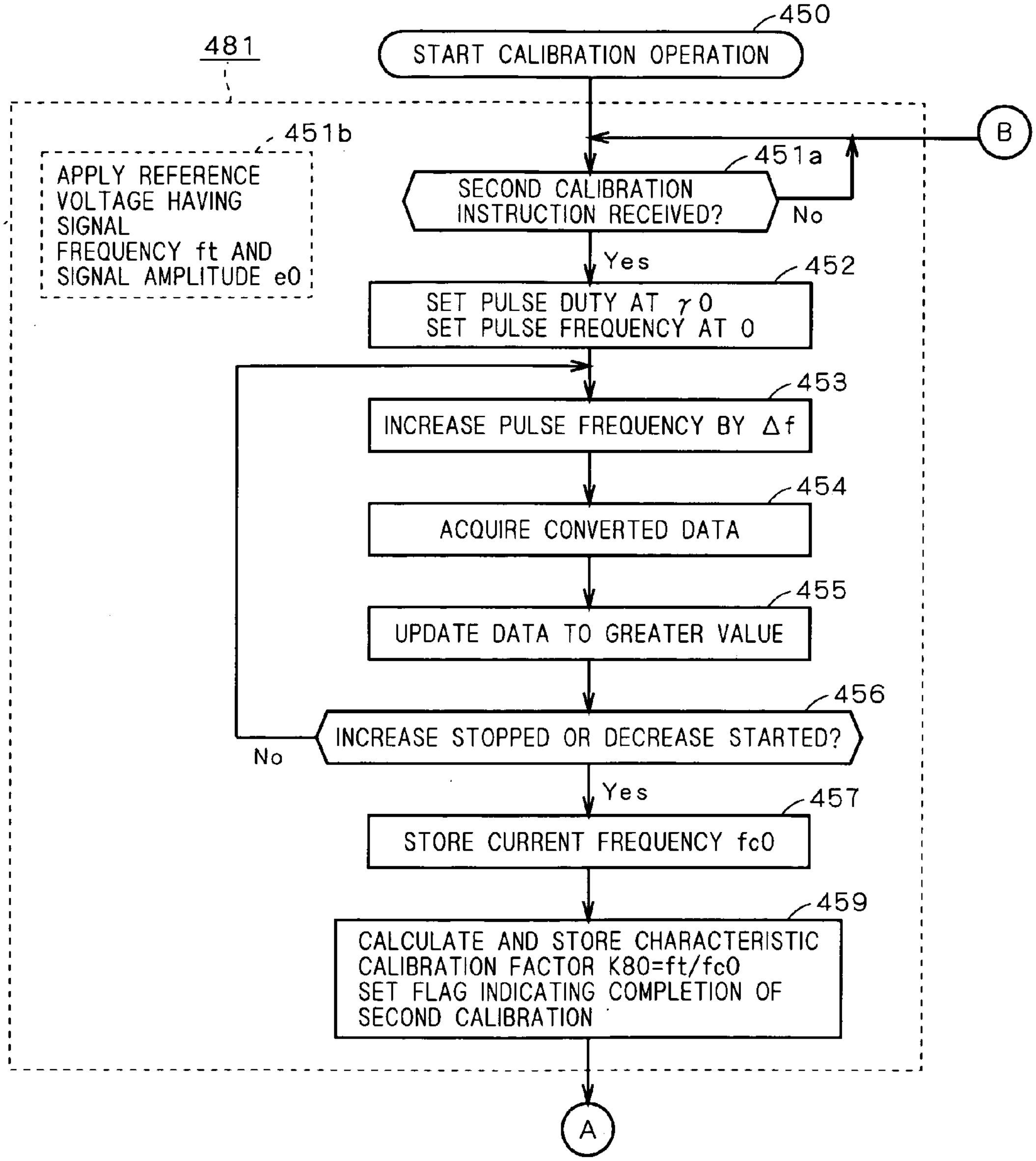
FIGS. 14 through 17 are flow charts of a calibration operation of the signal processor according to the fourth preferred embodiment.
Figure 15:
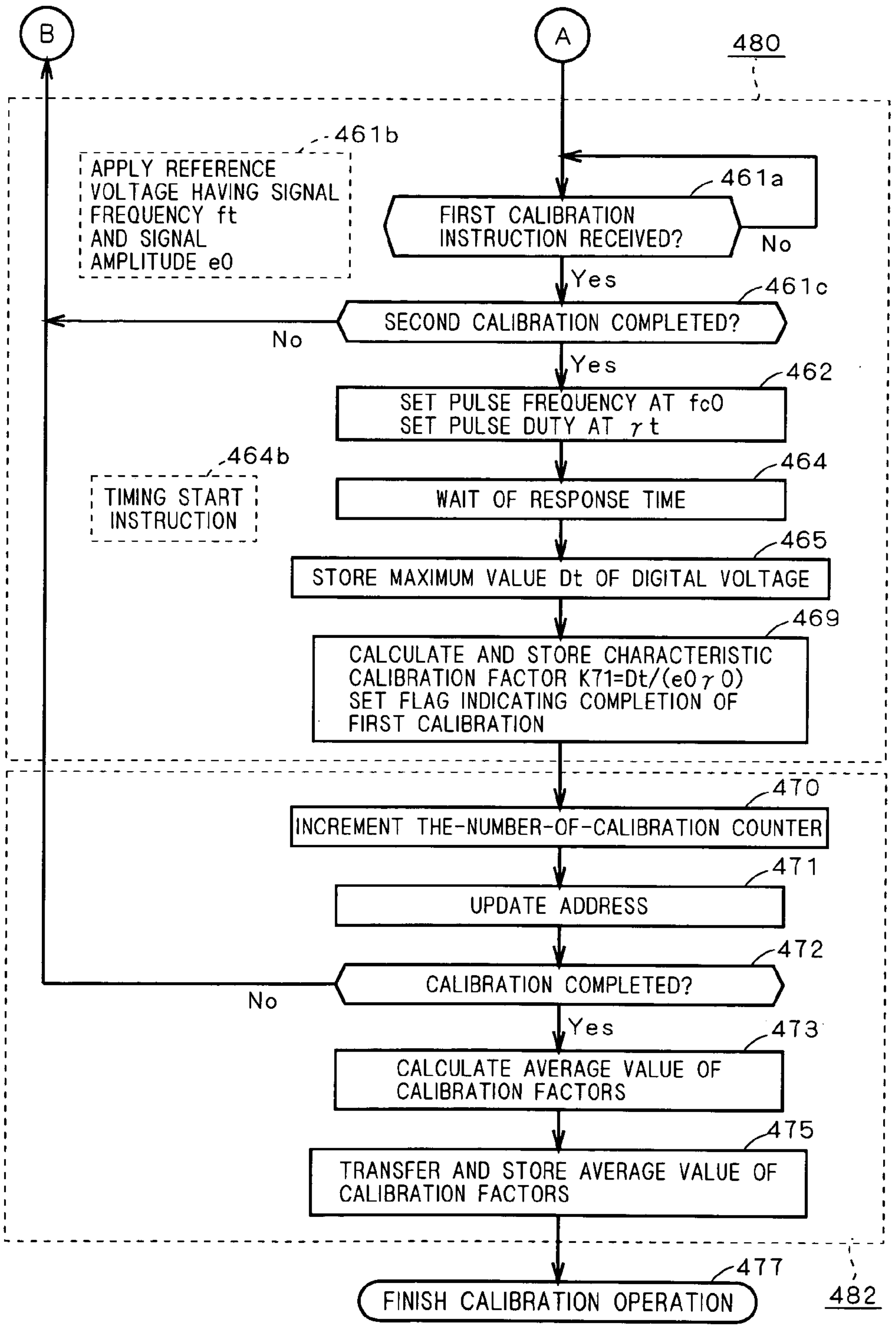

Next, a calibration operation of the signal processor according to the present embodiment will be discussed. FIGS. 14 and 15 are flow charts of the calibration operation of the signal processor according to the present embodiment. First, in a step 450 shown in FIG. 14, the calibration operation is started by supplying power to the microprocessor 110. In the subsequent step 451*a*, it is judged whether the second calibration instruction has been received from the external tool 140, and when the second calibration instruction has not been received, the process repeats the step 451*a* to wait until the second calibration instruction is received. Before the external tool 140 transmits the second calibration instruction, a calibration-specific signal source having the signal frequency ft and signal amplitude e0 is connected in place of the variable analog signal source 100*e* as shown in a block 451*b*, and voltage is applied to the gain control circuit 70*a*.

In the case where the pulse duty γ of the control signal pulse train CNT is set at a standard representative value (for example, γ0=0.5) and the center frequency of the band-pass filter circuit 80*a* agrees with the frequency ft of the variable analog signal source, an approximate value of the signal amplitude e0 is determined such that the maximum value Dt of the detected digital voltage input to the microprocessor 110 through the peak hold circuit 90*a* and AD converter 50 is 3.15V, for example. The frequency ft of the calibration-specific signal source is a practically standard representative value of the frequency ft of the variable analog signal source.

When the second calibration instruction is received, it is judged YES in the step 451*a*, and the process proceeds into a step 452. In the step 452, the pulse frequency of the control signal pulse train CNT is set at 0 and the pulse duty y is set at y0=0.5, for example, as a representative value. In the subsequent step 453, the pulse frequency of the control signal pulse train CNT is slightly increased by Δf from the current state. In the subsequent step 454, the digital output of the AD converter 50 is read by and stored in the microprocessor 110. In the subsequent step 455, it is judged which of a digital output previously read and stored and the currently read and stored digital output is greater, and stored data is updated to a greater value sequentially.

In the subsequent step 456, it is judged whether the stored data updated in the step 455 stops increasing or starts decreasing. When the stored data continues increasing, the process goes back to the step 453, and when it stops increasing, the process proceeds into a step 457. When proceeding into the step 457, the pulse frequency fc0 of the control signal pulse train CNT at the current time is stored. In the subsequent step 459, a ratio between the frequency ft of the calibration-specific signal source and the pulse frequency fc0 stored in the step 457 is calculated, and this ratio is stored as the characteristic calibration factor K80. Further, in the step 459, a flag indicating the completion of the second calibration based on the second calibration instruction is set.

Upon receipt of the setting of the flag in the step 459, the external tool 140 transmits the first calibration instruction with the calibration-specific signal source kept connected. In a step 461*a* shown in FIG. 15 subsequent to the step 459, it is judged whether the first calibration instruction has been received from the external tool 140, and when the first calibration instruction has not been received, the step 461*a* is repeated to wait until the first calibration instruction is received. When the first calibration instruction is received, it is judged YES in the step 461*a*, and the process proceeds into a step 461*c*. In the step 461*c*, it is judged whether the second calibration operation has been completed by monitoring the operation of the flag set in the step 459. When the calibration has not been completed, the process goes back to the step 451*a*, and when the calibration has been completed, the process proceeds into a step 462.

In the step 462, the pulse frequency of the control signal pulse train CNT is set at fc0 detected and stored in the step 457, and the pulse duty γ is set at γ0=0.5 as set in the step 452. In a step 464 subsequent to the step 462, there is a wait of a predetermined response time since the acquisition timing signal WIN is operated, and in the next step 465, the maximum value Dt of the detected digital voltage at the AD converter 50 read by the microprocessor 110 is written and stored in the RAM memory 120. In a step 469 subsequent to the step 465, the maximum value Dt of the detected digital voltage stored in the step 465, the pulse duty γ0 set in the step 462 and the amplitude e0 of the calibration-specific signal source of a known value are substituted into the following equation (20) to calculate and store a gain calibration factor K71. Further, in the step 469, a flag indicating the completion of the first calibration based on the first calibration instruction is set.

$$K71=Dt/(e0\times\gamma 0) \quad (20)$$

In a step 470 subsequent to the step 469, the-number-of-calibration counter is incremented, and in the subsequent step 471, addresses at which the calibration factors K80 and K71 obtained in the steps 459 and 469, respectively, are stored are updated. In the subsequent step 472, it is judged whether a predetermined number of calibrations have been completed, and when the predetermined number of calibrations have not been completed, the process goes back to the step 451*a* to start a calibration operation again, and when the predetermined number of calibrations have been completed, the process proceeds into a step 473.

In the step 473, a statistic value such as an average, mode or median of a plurality of gain calibration factors K71 and that of a plurality of characteristic calibration factors K80 stored in the RAM memory 120 are calculated and stored in the RAM memory 120 at the addresses updated in step 471. In the subsequent step 475, the calibration factors K71 and K80 calculated and stored in the step 473 are transferred to and stored in the non-volatile data memory 121, and the process proceeds into a step 477, where the calibration operation is completed.

Although being set at 0 in the step 452, the pulse frequency may be set at a sufficiently great value and may be gradually decreased to zero through the step 453. Further, the voltage of the calibration-specific signal source may be varied intentionally in each of a plurality of calibration operations so as to perform measured calibrations widely applicable to practical use.

Summarizing the above-described calibration operation, a process block 481 including the steps 451*a* to 459 serves as the second calibration means for calculating the characteristic calibration factor K80 while monitoring the output of the AD converter 50 using the calibration-specific signal source having a known voltage and a known frequency.

A process block 480 including the steps 461*a* to 469 serves as the first calibration means for calculating the gain calibration factor K71 while monitoring the output of the AD converter 50 using the calibration-specific signal sources having a known voltage and a known frequency.

A process block 482 including the steps 470 to 475 serves as the transfer-storage means, and the step 472 serves as the repetitive calibration means. In the transfer-storage means according to the present embodiment, an abnormality judgment may be performed as to whether or not the calibration factors fall within an allowable numerical range, as in the first preferred embodiment. Although FIGS. 14 and 15 indicates that the calibration-specific signal source is connected in place of the variable analog signal source 100*e*, the calibration-specific signal source is also connected in place of the variable analog signal source 100*f* so that a plurality of calibrations are performed while the multiplexer 40*e* is driven each time the repetitive calibration means 472 operates.

Figure 16:
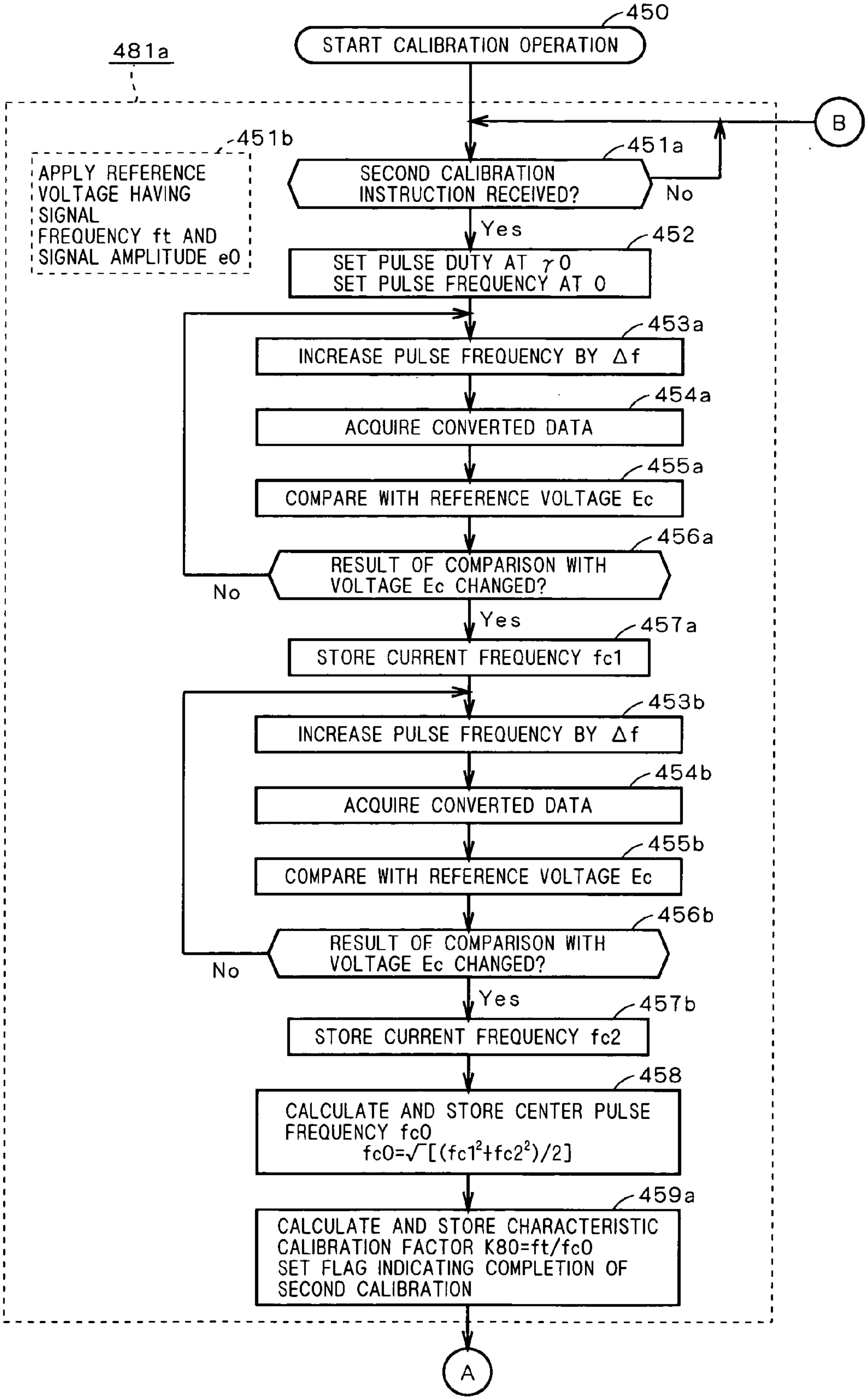
Figure 17:
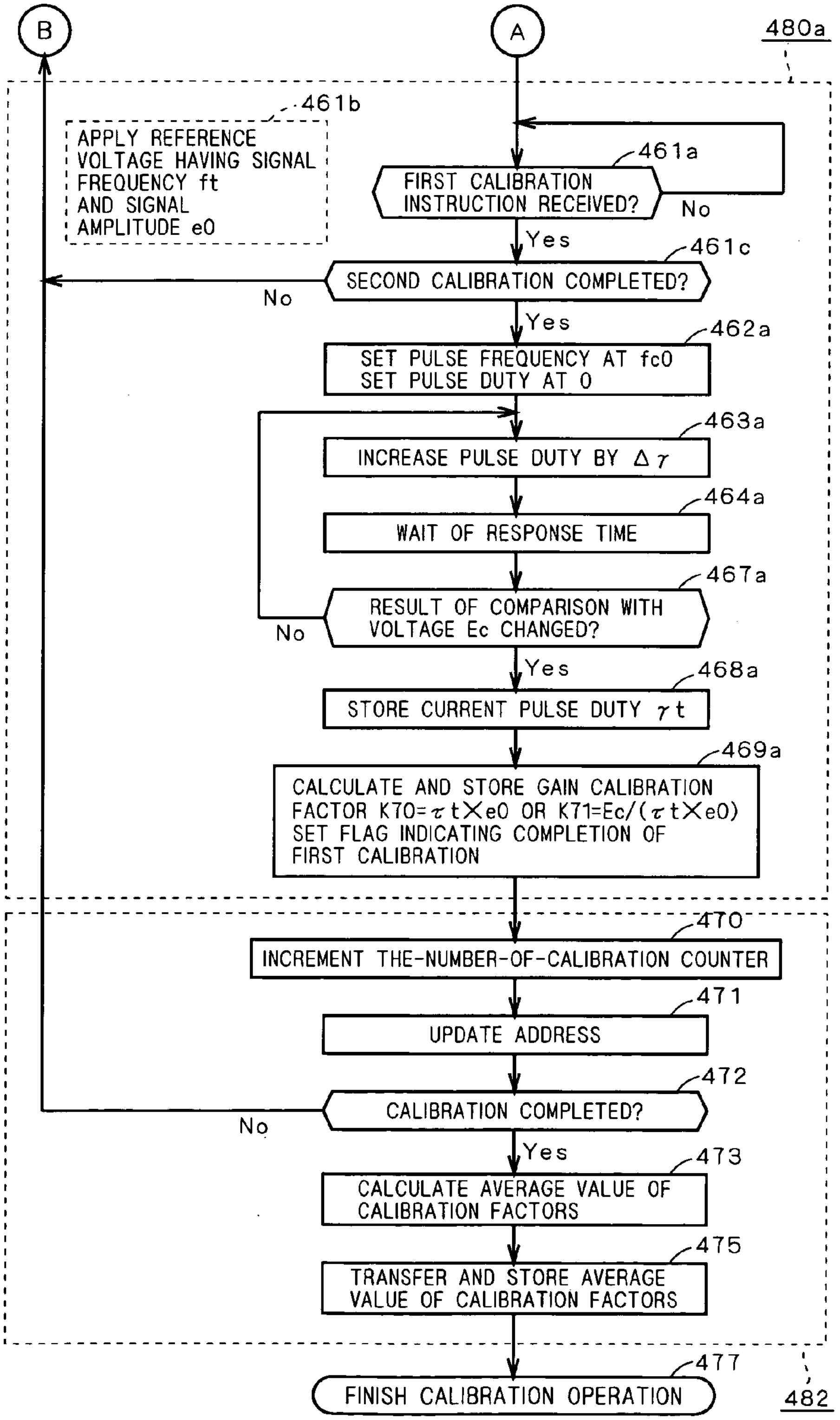

The signal processor according to the present embodiment is not limited to perform the calibration operation shown in FIGS. 14 and 15. A calibration operation different from that shown in FIGS. 14 and 15 will be described. FIGS. 16 and 17 are flow charts of a calibration operation different from that shown in FIGS. 14 and 15. In the step 450 shown in FIG. 16, the calibration operation is started by supplying power to the microprocessor 110. In the next step 451*a*, it is judged whether the second calibration instruction has been received from the external tool 140, and when the second calibration instruction has not been received, the process repeats the step 451*a* to wait until the second calibration instruction is received.

Before the external tool 140 transmits the second calibration instruction, a calibration-specific signal source having the signal frequency ft and signal amplitude e0 is connected in place of the variable analog signal source 110*e* as shown in the block 451*b* and voltage is applied to the gain control circuit 70*a*.

In the case where the pulse duty γ of the control signal pulse train CNT is set at a standard representative value (for example, γ0=0.5) and the center frequency of the band-pass filter circuit 80*a* agrees with the frequency ft of the variable analog signal source, an approximate value of the signal amplitude e0 is determined such that the maximum value Dt of the detected digital voltage input to the microprocessor 110 through the peak hold circuit 90*a* and AD converter 50 is 3.15V, for example. The frequency ft of the calibration-specific signal source is a practically standard representative value of the frequency ft of the variable analog signal source.

When the second calibration instruction is received, it is judged YES in the step 451*a*, and the process proceeds into the step 452. In the step 452, the pulse frequency of the control signal pulse train CNT is set at 0 and the pulse duty γ is set at y0=0.5, for example, as a representative value. In the subsequent step 453*a*, the pulse frequency of the control signal pulse train CNT is slightly increased by Δf from the current state. In the subsequent step 454*a*, the digital output of the AD converter 50 is read by and stored in the microprocessor 110. In the subsequent step 455*a*, it is judged which of the digital output read and stored in the step 454*a* and the standard reference digital voltage Ec is greater. In the subsequent step 456*a*, it is judged whether the result of comparison in the step 455*a* has changed, and when there is no change, the process goes back to the step 453*a*, and when there is a change, the process proceeds into the step 457*a*.

In the step 457*a*, the pulse frequency fc1 of the control signal pulse train CNT at which the result of comparison changes is stored. In the subsequent step 453*b*, the pulse frequency of the control signal pulse train CNT is continuously increased slightly by Af. In the subsequent step 454*b*, the digital output of the AD converter 50 is read by and stored in the microprocessor 110, and in the subsequent step 455*b*, it is judged which of the digital output read and stored in the step 454*b* and the standard reference digital voltage Ec is greater. In the subsequent step 456*b*, it is judged whether the result of digital comparison in the step 455*b* has changed, and when there is no change, the process goes back to the step 453*b*, and when there is a change, the process proceeds into a step 457*b*. In the step 457*b*, the pulse frequency fc2 of the control signal pulse train CNT at which the result of digital comparison changes is stored.

In a step 458 subsequent to the step 457*b*, the pulse frequency fc0 of the control signal pulse train CNT is calculated and stored based on the equation (19). In the subsequent step 459*a*, a ratio between the frequency ft of the calibration-specific signal source and the pulse frequency fc0 stored in the step 458 is calculated and is stored as the characteristic calibration factor K80. Further, in the step 459*a*, a flag indicating the completion of the second calibration based on the second instruction is set.

Upon receipt of the setting of the flag in the step 459*a*, the external tool 140 transmits the first calibration instruction with the calibration-specific signal source kept connected. In the step 461*a* shown in FIG. 17 subsequent to the step 459*a*, it is judged whether the first calibration instruction has been received from the external tool 140, and when the first calibration instruction has not been received, the step 461*a* is repeated to wait until the first calibration instruction is received. When the first calibration instruction is received, it is judged YES in the step 461*a*, and the process proceeds into the step 461*c*. In the step 461*c*, it is judged whether the second calibration operation has been completed by monitoring the operation of the flag set in the step 459*a*. When the calibration has not been completed, the process goes back to the step 451*a*, and when the calibration has been completed, the process proceeds into a step 462*a*.

In the step 462*a*, the pulse frequency of the control signal pulse train CNT is set at fc0 calculated and stored in the step 458, and the pulse duty γ is set at 0. In a step 463*a* subsequent to the step 462*a*, the pulse duty γ is slightly increased by Δγ, and in the next step 464*a*, there is a wait of a predetermined response time since the acquisition timing signal WIN is operated. In the subsequent step 467*a*, it is judged whether the result of digital comparison between the maximum value Dt of the detected digital voltage at the AD converter 50 read by the microprocessor 110 and the standard reference digital voltage Ec has changed, and when there is no change, the process goes back to the step 463*a* to slightly increase the pulse duty γ again, and when there is a change, the process proceeds into a step 468*a*.

In the step 468*a*, the pulse duty γt at which the result of digital comparison changes is stored. In the subsequent step 469*a*, the gain calibration factor K70 is calculated and stored based on the following expression (21) or gain calibration factor K71 is calculated and stored based on the following expression (22). Further, in the step 469*a*, a flag indicating the completion of the first calibration based on the first calibration instruction is set.

$$K70 = e0 \times \gamma t \tag{21}$$

$$K71 = Ec/(e0 \times \gamma t) \tag{22}$$

In the step 470 subsequent to the step 469*a*, the-number-of-calibration counter is incremented, and in the subsequent step 471, addresses at which the calibration factors K80 and K70 or K71 obtained in the steps 459*a* and 469*a*, respectively, are stored are updated. In the subsequent step 472, it is judged whether a predetermined number of calibrations have been completed, and when the predetermined number of calibrations have not been completed, the process goes back to the step 451*a* to start a calibration operation again, and when the predetermined number of calibrations have been completed, the process proceeds into the step 473.

In the step 473, a statistic value such as an average, mode or median of a plurality of gain calibration factors K71 or K70 and that of a plurality of characteristic calibration factors K80 stored in the RAM memory 120 are calculated and stored in the RAM memory 120 at the addresses updated in the step 471. In the next step 475, the calibration factors K71 or K70 and K80 calculated and stored in the step 473 are transferred to and stored in the non-volatile data memory 121, and the process proceeds into the step 477, where the calibration operation is completed.

Although being set at 0 in the step 452, the pulse frequency may be set at a sufficiently great value and may be gradually decreased to zero through the steps 453*a* and 453*b*. Similarly, although set at 0 in the step 462*a*, the pulse duty may be set at 1 and may be gradually decreased to zero through the step 463*a*. Further, the voltage of the calibration-specific signal source may be varied intentionally in each of a plurality of calibration operations so as to perform measured calibrations widely applicable to practical use.

Summarizing the above-described calibration operation, a process block 481*a* including the steps 451*a* to 459*a* serves as the second calibration means for calculating the characteristic calibration factor K80 while monitoring whether the output of the AD converter 50 is equal or higher than the standard reference digital voltage Ec using the calibration-specific signal source having a known voltage and a known frequency.

A process block 480*a* including the steps 461*a* to 469*a* serves as the first calibration means for calculating the gain calibration factor K71 or K70 while monitoring whether the output of the AD converter 50 is equal or higher than the standard reference digital voltage Ec using the calibration-specific signal source having a known voltage and a known frequency.

The process block 482 including the steps 470 to 475 serves as the transfer-storage means, and the step 472 serves as the repetitive calibration means. In the transfer-storage means according to the present embodiment, an abnormality judgment may be performed as to whether or not the calibration factors fall within an allowable numerical range, as in the first preferred embodiment. Although FIGS. 16 and 17 indicate that the calibration-specific signal source is connected in place of the variable analog signal source 100*e*, the calibration-specific signal source is also connected in place of the variable analog signal source 100*f* so that a plurality of calibrations are performed while the multiplexer 40*e* is driven each time the repetitive calibration means 472 operates.

As is apparent from the above description, the signal processor according to the present embodiment is different from that of the first preferred embodiment in that the variable analog signal sources 100*e* and 100*f* generate pulsation signals. The band-pass filter circuit 80*a* constitutes a band-pass filter circuit whose center frequency is variably adjusted in response to the pulse frequency of the control signal pulse train CNT. The analog input signal processor 104 further includes the peak hold circuit 90*a* between the band-pass filter circuit 80*a* and AD converter 50, and the microprocessor 110 includes data-acquisition-timing generating means.

The peak hold circuit 90*a* includes the maximum-value storage capacitor 94 charged through the backflow prevention diode 92 and the discharge switching device 95 for periodically discharging electric charges at the capacitor 94. The data-acquisition-timing generating means periodically generates the acquisition timing signal WIN for transferring the digital logic signal to the RAM memory 120 through the AC converter 50 and microprocessor 110 and storing the digital logic signal in the RAM memory 120 after the discharge switching device 95 is closed to discharge the electric charges at the maximum-value storage capacitor 94 and is then opened to recharge the capacitor 94 for a predetermined time period. The digital logic signal is related to a voltage applied in the recharge.

As described, the signal processor according to the present embodiment is intended for detecting the maximum value of the signal voltage from the variable analog signal source 100*e* or 100*f* at a certain frequency, and is capable of detecting the maximum value of the signal voltage at a certain frequency setting the center frequency of the band-pass filter circuit at the certain frequency of the signal source 100*e* or 100*f*. Further, controlling the pulse duty y of the control signal pulse train CNT which adjusts filter characteristics allows the amplification factor of the input signal processor to be independently adjusted.

Furthermore, in the signal processor according to the present embodiment to which a standard signal source generating voltage having the predetermined signal amplitude e0 and signal frequency ft is connected in place of the variable analog signal sources 100*e* and 100*f*, the second calibration means 481 gradually increases or decreases the pulse frequency of the control signal pulse train CNT setting the pulse duty of the control signal pulse train CNT supplied to the gain control circuit 70*a* at a practically standard value γ0. Then, the second calibration means 481 stores the pulse frequency at which the trend of the detected digital voltage at the AD converter 50 changes as the center pulse frequency fc0, thereby calculating the characteristic calibration factor K80=ft/fc0. After the second calibration means 481, the first calibration means 480 reads and stores the maximum value Dt of the detected digital voltage at the AD converter 50 using the signal frequency ft and signal amplitude e0 applied in the first calibration means 480 and setting the pulse duty and pulse frequency of the control signal pulse train CNT at γ0 and the center pulse frequency fc0, respectively, set in the second calibration means 481, thereby calculating the gain calibration factor K71=Dt/(e0×γ0).

As described, the signal processor according to the present embodiment is capable of calibrating the relation between the pulse frequency of the control signal pulse train CNT and the center frequency using the second calibration means 481 even if precise gain characteristics are unknown as well as calibrating the whole gain of the input signal processor accurately and effectively using the control signal pulse train CNT used in the calibration operation. Further, even if conversion characteristics fluctuate from product to product, the signal processor according to the present embodiment is capable of calibrating the whole gain including such fluctuations.

Furthermore, in the signal processor according to the present embodiment, the first calibration means 480*a* as another calibration means after the operation performed by the first calibration means 481*a*, detects and stores the pulse duty γt at which the result of digital comparison between the detected digital voltage at the AD converter 50 and the standard reference digital voltage Ec changes while gradually increasing or decreasing the pulse duty using the signal frequency ft and signal amplitude e0 applied in the second calibration means 481*a* and setting the pulse frequency of the control signal pulse train CNT at the center pulse frequency fc0 detected in the second calibration means 481*a*, thereby calculating the gain calibration factor K70=γt×e0 or K71=Ec/(γt×e0). Therefore, the gain calibration factor K70 or K71 can be calculated by determining the standard reference digital voltage Ec without temporarily using the standard pulse duty y0, which can achieve an improved calibration accuracy in a practical voltage region.

Furthermore, in the signal processor according to the present embodiment, the second calibration means 481*a* as another calibration means gradually increases or decreases the pulse frequency of the control signal pulse train CNT with a standard signal source having a predetermined signal amplitude e0 and signal frequency ft being connected as a calibration-specific signal source, setting the pulse duty of the control signal pulse train CNT supplied to the gain control circuit 70*a* at the practically standard value γ0, to detect the first and second frequencies fc1 and fc2 at which the result of digital comparison between the detected digital voltage at the AD converter 50 and the standard reference digital voltage Ec changes, thereby obtaining the pulse frequency $fc0=\sqrt{(fc1^2+fc2^2)/2}$ and then calculating the characteristic calibration factor K80=ft/fc0. Accordingly, the first and second frequencies fc1 and fc2 are detected in a frequency band in which the rate of change of gain is great without detecting the center frequency at a peak point in frequency characteristics at which the rate of change of gain with respect to frequencies is small. This can achieve an improved detection accuracy of the center frequency.

Still further, in the signal processor according to the present embodiment, the variable analog signal sources 100*e* and 100*f* are knock sensors for detecting cylinder vibrations provided for a plurality of cylinders of an internal combustion engine, and the plurality of knock sensors 100*e* and 100*f* are selectively switched through the multiplexer 40*e* to do input to the band-pass filter circuit 80*a*.

The band-pass filter circuit 80*a* variably adjusts the center frequency in response to the pulse frequency of the control signal pulse train CNT, and the signal processor includes the peak hold circuit 90*a* in a preceding stage of the AD converter 50. The microprocessor 110 includes the data-acquisition-timing generating means and connection-switching-signal generating means.

The connection-switching-signal generating means supplies the connection switching signal MPX to the multiplexer 40*e* so as to select one of the knock sensors 100*e* and 100*f* provided for cylinders that is in the state just before an explosion step in response to an angle detected by the clank angle sensor of the internal combustion engine. The data-acquisition-timing generating means determines the timing of data acquisition in response to the angle detected by the clank angle sensor.

The signal processor according to the present embodiment configured as described above only needs to perform knock detection successively even if the plurality of knock sensors 100*e* and 100*f* are connected, and there is no need to add the band-pass filter circuit 80*a*, gain control circuit 70*a* and AD converter 50*a*. Thus, the microprocessor 110 only needs to have one input terminal. Further, filter characteristics and amplification factor of the gain control circuit are adjusted independently in accordance with the rotation speed of the engine and load conditions, allowing knock detection to be performed with high accuracy.

Fifth Preferred Embodiment

Figure 18:
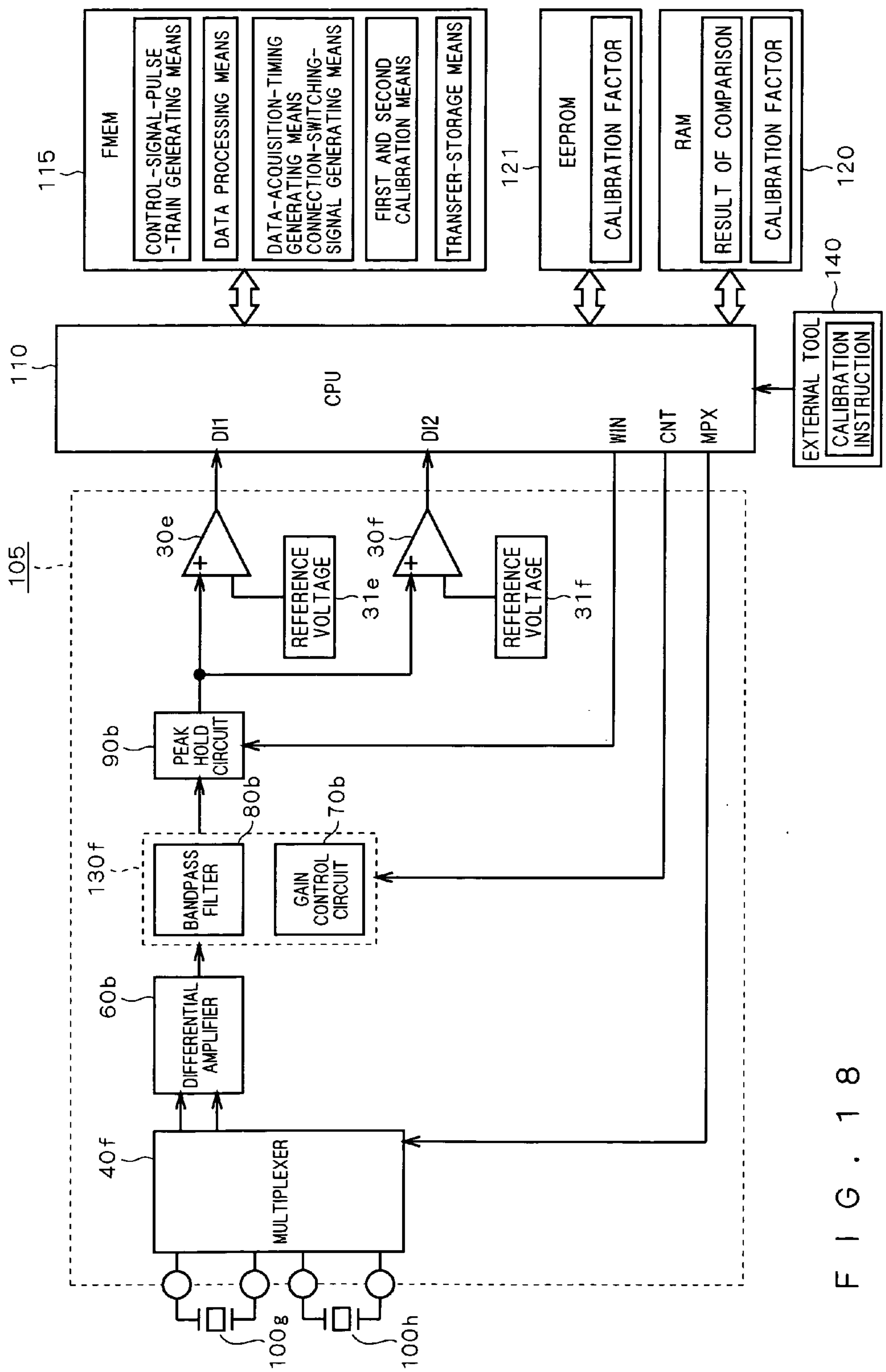
FIG. 18 is a circuit diagram of a signal processor according to a fifth preferred embodiment of the invention.

FIG. 18 is a general circuit diagram of a signal processor according to the present embodiment. The signal processor according to the present embodiment will be discussed in reference to FIG. 18. In FIG. 18, an analog input signal processor 105 is provided between variable analog signal sources 100*g*, 100*h* and microprocessor 110.

The analog input signal processor 105 according to the present embodiment is formed by a multiplexer 40*f*, a differential amplifier 60*b*, a circuit block 130*f* including a gain control circuit 70*b* and a band-pass filter circuit 80*b*, and a peak hold circuit 90*b*, similarly to those discussed referring to FIG. 12. In the analog input signal processor 105 according to the present embodiment, however, first and second analog comparator circuits 30*e* and 30*f* are used as data converters instead of the AD converter 50. First and second standard reference voltages 31*e* and 31*f* are applied to the first and second analog comparator circuits 30*e* and 30*f*, respectively. The band-pass filter circuit 80*b* is formed by a switched capacitor filter circuit.

The microprocessor 110 supplies the acquisition timing signal WIN to the peak hold circuit 90*b*, the connection switching signal MPX to the multiplexer 40*f* and the control signal pulse train CNT to the gain control circuit 70*b* and band-pass filter circuit 80*b*. The results of comparisons output from the first and second analog comparator circuits 30*e* and 30*f* are input to the microprocessor 110 as digital logic signals DI1 and DI2, respectively.

A non-volatile program memory 115 (such as a flash memory) bus-connected to the microprocessor 110 stores a communication program with the external tool 140 and a control program depending on applications of the microprocessor 110 and the like in addition to programs serving as the control-signal-pulse-train generating means, equivalent changing means, data-acquisition-timing generating means, connection-switching-signal generating means, first and second calibration means and transfer-storage means.

The results of comparisons made by the first and second analog comparator circuits 30*e* and 30*f* and calibration factors calculated by the calibration operation are written into the RAM memory 120 for arithmetic operation bus-connected to the microprocessor 110. Calibration factors obtained by calibrations performed by the first and second calibration means are transferred from the RAM memory 120 to the non-volatile data memory 121 such as EEPROM bus-connected or serial-connected to the microprocessor 110 and are stored in the data memory 121. The external tool 140 to be serial-connected to the microprocessor 110 when performing the calibration operation transmits the first and second calibration instructions to the microprocessor 110.

Figure 19:
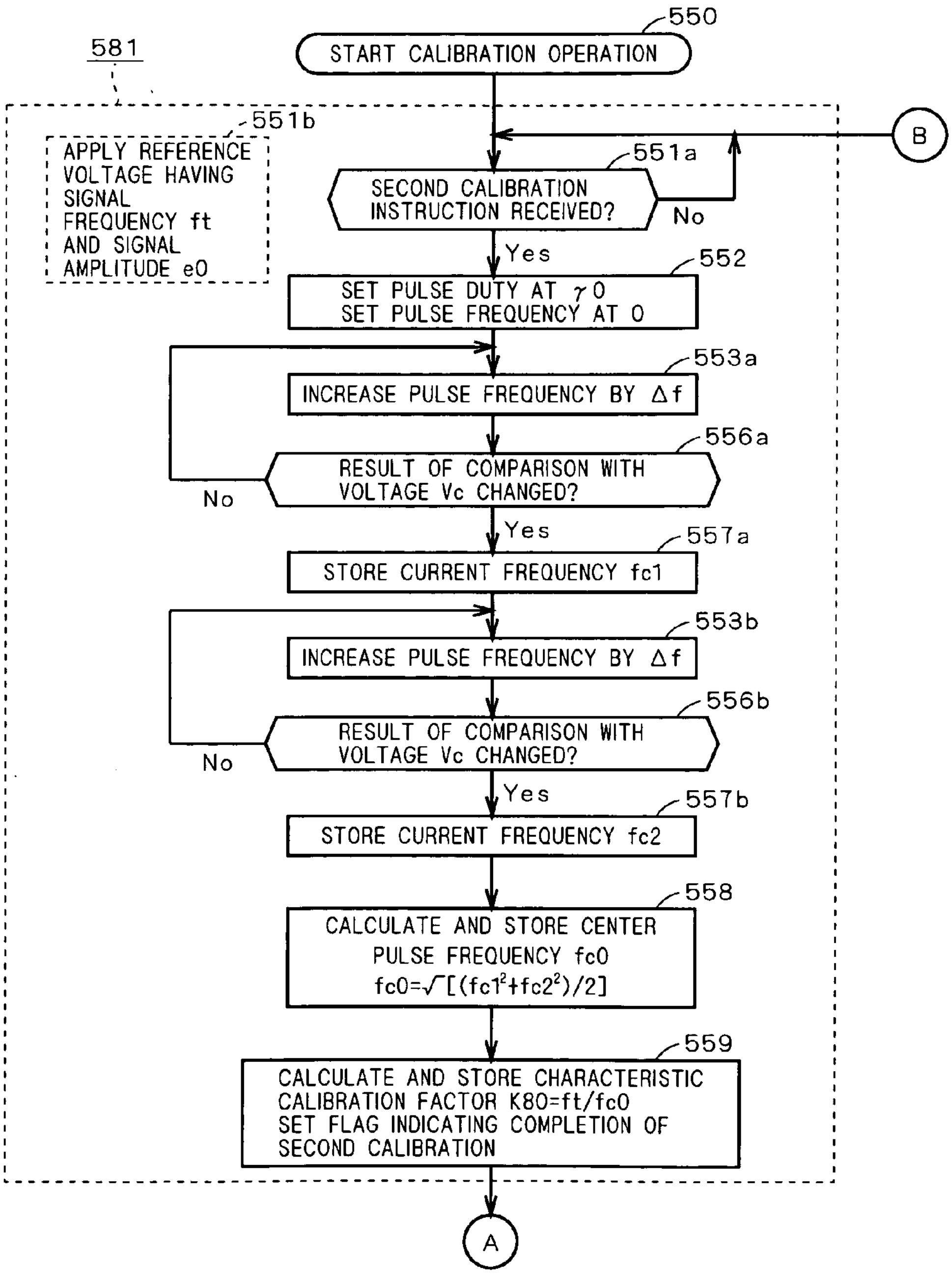
FIGS. 19 and 20 are flow charts of a calibration operation of the signal processor according to the fifth preferred embodiment.
Figure 20:
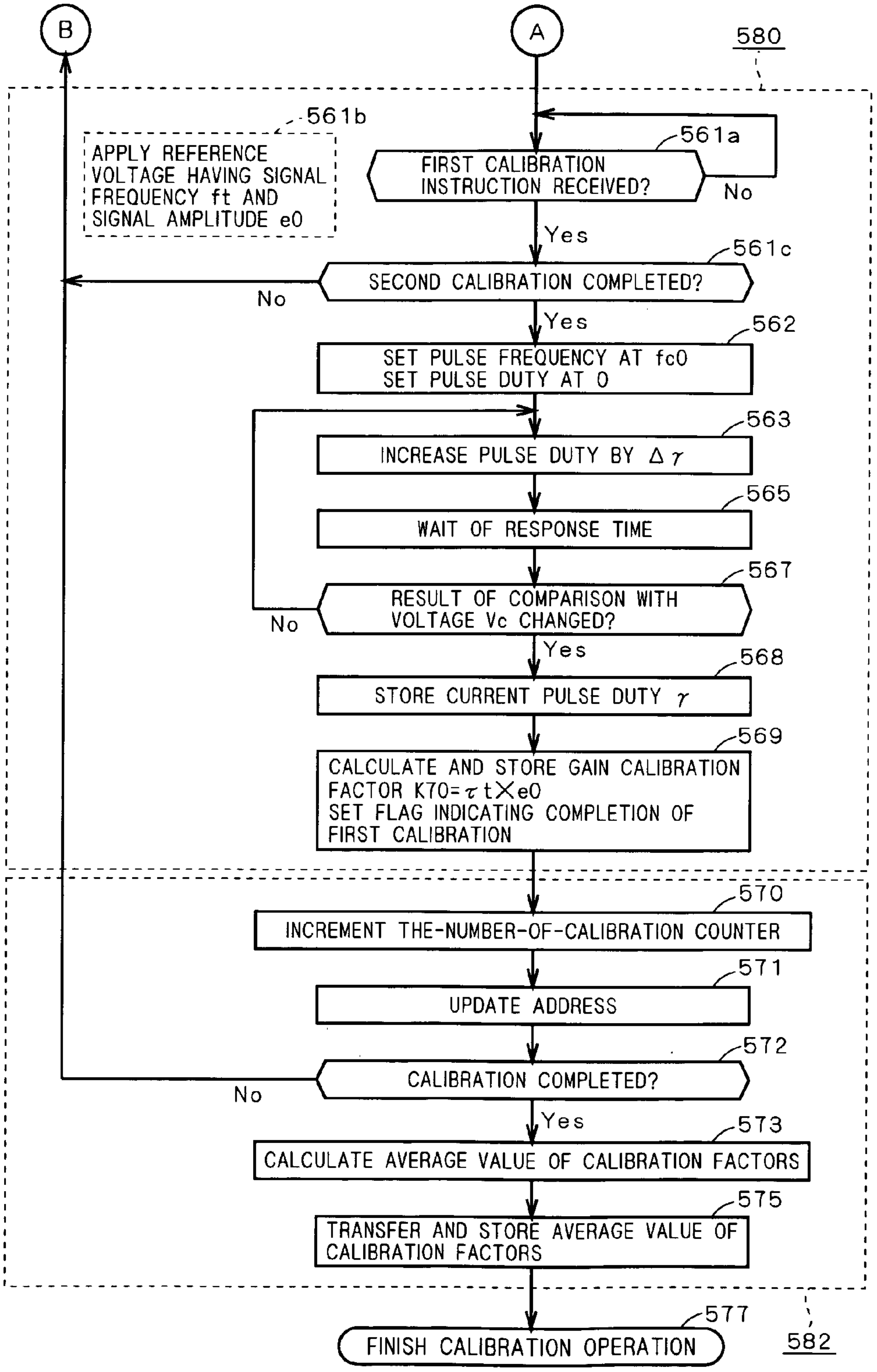

Next, the calibration operation of the signal processor according to the present embodiment will be discussed. FIGS. 19 and 20 are flow charts of the calibration operation of the signal processor according to the fifth preferred embodiment. First, in a step 550 shown in FIG. 19, the calibration operation is started by supplying power to the microprocessor 110. In the subsequent step 551*a*, it is judged whether the second calibration instruction has been received from the external tool 140, and when the second calibration instruction has not been received, the step 551*a* is repeated to wait until the second calibration instruction is received.

Before the external tool 140 transmits the second calibration instruction, a calibration-specific signal source having the signal frequency ft and signal amplitude eO is connected in place of the variable analog signal source 100*e* as shown in a block 551*b*, and voltage is applied to the gain control circuit 70*b*.

In the case where the pulse duty γ of the control signal pulse train CNT is set at a standard representative value (for example, γ0=0.5) and the center frequency of the band-pass filter circuit 80*b* agrees with the frequency ft of the variable analog signal source, an approximate value of the signal amplitude e0 is determined such that an output voltage of the peak hold circuit 90*a* is equal to the first standard reference voltage 31*e* or second standard reference voltage 31*f*. The frequency ft of the calibration-specific signal source is a practically standard representative value of the frequency ft of the variable analog signal source.

When the second calibration instruction is received, it is judged YES in the step 551*a*, and the process proceeds into a step 552, where the pulse frequency of the control signal pulse train CNT is set at 0 and the pulse duty is set at γ0=0.5, for example. In the subsequent step 553*a*, the pulse frequency of the control signal pulse train CNT is slightly increased by Δf from the current state. In the subsequent step 556*a*, it is judged whether the result of comparison made by the first analog comparator circuit 30*e*, for example, has changed. When there is no change, the process goes back to the step 553*a*, and when there is a change, the process proceeds into a step 557*a*. In the step 557*a*, the pulse frequency fc1 of the control signal pulse train CNT at which the result of comparison changes is stored.

In the subsequent step 553*b*, the pulse frequency of the control signal pulse train CNT is continuously increased slightly by Δf. In the subsequent step 556*b*, it is judged whether the result of comparison made by the first analog comparator circuit 30*e*, for example, has changed, and when there is no change, the process goes back to the step 553*b*, and when there is a change, the process proceeds in to a step 557*b*. In the step 557*b*, the pulse frequency fc2 of the control signal pulse train CNT at which the result of comparison changes is stored.

In a step 558 subsequent to the step 557*b*, the pulse frequency fc0 of the control signal pulse train CNT is calculated based on the equation (19) and stored. In the subsequent step 559, a ratio between the frequency ft of the calibration-specific signal source and the pulse frequency fc0 stored in the step 558 is calculated, and this ratio is stored as the characteristic calibration factor K80, and a flag indicating the completion of the second calibration based on the second calibration instruction is set.

Upon receipt of the setting of the flag in the step 559, the external tool 140 transmits the first calibration instruction with the calibration-specific signal source kept connected. In a step 561*a* shown in FIG. 20 subsequent to the step 559, it is judged whether the first calibration instruction has been received from the external tool 140, and when the first calibration instruction has not been received, the step 561*a* is repeated to wait until the first calibration instruction is received. When the first calibration instruction is received, it is judged YES in the step 561*a*, and the process proceeds into a step 561*c*. In the step 561*c*, it is judged whether the second calibration operation has been completed by monitoring the operation of the flag set in the step 559. When the second calibration has not been completed, the process goes back to the step 551*a*, and when the second calibration has been completed, the process proceeds into a step 562.

In the step 562, the pulse frequency of the control signal pulse train CNT is set at fc0 as calculated and stored in the step 558, and the pulse duty γ is set at 0. In a step 563 subsequent to the step 562, the pulse duty is slightly increased by Δγ. In the subsequent step 564, there is a wait of a predetermined response time since the acquisition timing signal WIN is operated. In the next step 567, it is judged whether the result of comparison made by the first analog comparator circuit 30*e* as read by the microprocessor 110 has changed, and when there is no change, the process goes back to the step 563, where the pulse duty is slightly increased again. When there is a change, the process proceeds into a step 568.

In the step 568, the pulse duty γt at which the result of comparison changes is stored. In the subsequent step 569, the gain calibration factor K70 is calculated based on the equation (21) and stored. Further, in the step 568, a flag indicating the completion of the first calibration based on the first calibration instruction is set.

In a step 570 subsequent to the step 569, the-number-of-calibration counter is incremented, and in the subsequent step 571, addresses at which the calibration factors K80 and K70 obtained in the steps 559 and 569, respectively, are stored are updated. In the subsequent step 572, it is judged whether a predetermined number of calibrations have been completed, and when the predetermined number of calibrations have not been completed, the process goes back to the step 551*a* to start a calibration operation again, and when the predetermined number of calibrations have been completed, the process proceeds into a step 573.

In the step 573, a statistic value such as an average, mode or median of a plurality of gain calibration factors K70 and that of a plurality of characteristic calibration factors K80 stored in the RAM memory 120 are calculated and stored in the RAM memory 120 at the addresses updated in the step 571. In the subsequent step 575, the calibration factors K70 and K80 calculated and stored in the step 573 are transferred to and stored in the non-volatile data memory 121. Then, the process proceeds into a step 577, where the calibration operation is completed.

Although being set at 0 in the step 552, the pulse frequency may be set at a sufficiently great value and may be gradually decreased to zero through the steps 553*a* and 553*b*. Similarly, although being set at 0 in the step 562, the pulse duty may be set at $\gamma=1$, and may be gradually decreased to zero through the step 563. Further, the voltage of the calibration-specific signal source may be varied intentionally in each of a plurality of calibration operations so as to perform measured calibrations widely applicable to practical use. Furthermore, a similar calibration operation is performed for the second analog comparator circuit 30*f*, to calculate a calibration factor relative to fluctuations in the second standard reference voltage 31*f* from product to product.

Summarizing the above-described calibration operation, a process block 581 including the steps 551*a* to 559 serves as the second calibration means for calculating the characteristic calibration factor K80 while monitoring the results of comparisons made by the first and second analog comparator circuits 30*e* and 30*f* using the calibration-specific signal source having a known voltage and known frequency. A process block 580 including the steps 561*a* to 569 serves as the first calibration means for calculating the gain calibration factor K70 while monitoring the results of comparison of the analog comparator circuits 30*e* and 30*f* using the calibration-specific signal source having a known voltage and known frequency.

A process block 582 including the steps 570 to 575 serves as the transfer-storage means, and the step 572 serves as the repetitive calibration means. In the transfer-storage means according to the present embodiment, an abnormality judgment may be performed as to whether or not the calibration factors fall within an allowable numerical range, as in the first preferred embodiment. Although FIGS. 19 and 20 indicates that the calibration-specific signal source is connected in place of the variable analog signal source 100*g*, the calibration-specific signal source is also connected in place of the variable analog signal source 100*h* so that a plurality of calibrations are performed while the multiplexer 40*f* is driven each time the repetitive calibration means 572 operates.

As is apparent from the above description, the signal processor according to the present embodiment uses the first and second analog comparator circuits 30*e* and 30*f* as data converters, different from the fourth preferred embodiment. The first and second analog comparator circuits 30*e* and 30*f* convert the signal voltage obtained through the band-pass filter circuit 80*b* and gain control circuit 70*b* into the digital logic signals DI1 and D12 comparing with the reference voltages 31*e* and 31*f*, respectively, and input the digital logic signals DI1 and D12 to the microprocessor 110.

Further, in the signal processor according to the present embodiment, a standard signal source generating voltage having the predetermined signal amplitude e0 and signal frequency ft is connected in place of the variable analog signal sources 100*g* and 100*h*, and the second calibration means 581 gradually increases or decreases the pulse frequency of the control signal pulse train CNT setting the pulse duty of the control signal pulse train CNT supplied to the gain control circuit 70*b* at the practically standard value y0, to detect the first and second frequencies fc1 and fc2 at which the result of digital comparison made by the analog comparator circuit 30*e* or 30*f* changes, thereby obtaining the center pulse frequency $fc0=\sqrt{(fc1^2+fc2^2)/2}$ and then obtaining the calibration factor K80=ft/fc0.

Furthermore, the first calibration means 580, after the first calibration means 581, detects and stores the pulse duty γt at which the result of comparison made by either the analog comparator circuit 30*e* or 30*f* comparing with the standard reference voltage Vc changes while gradually increasing or decreasing the pulse duty γ using the signal frequency ft and signal amplitude e0 as applied in the second calibration means 581 and setting the pulse frequency of the control signal pulse train CNT at the center pulse frequency fc0 as calculated and stored in the second calibration means 581, thereby calculating the gain calibration factor K70=γt×e0.

As described, the signal processor according to the present embodiment is capable of calibrating the relation between the pulse frequency of the control signal pulse train CNT and the center frequency using the second calibration means 581 even if precise gain characteristics are unknown as well as calibrating the whole gain of the input signal processor accurately and effectively with the control signal pulse train CNT used in the calibration operation. Further, even if the first and second standard reference voltages 31*e* and 31*f* of the analog comparator circuits 30*e* and 30*f* fluctuate from product to product, the signal processor according to the present embodiment can calibrate the whole gain including such fluctuations.

While the invention has been shown and described in detail, the foregoing description is in all aspects illustrative and not restrictive. It is therefore understood that numerous modifications and variations can be devised without departing from the scope of the invention.

What is claimed is:

1. A signal processor comprising:

a microprocessor for generating and supplying a control signal pulse train;

a gain control circuit including a first switching device opened/closed by said control signal pulse train supplied from said microprocessor and a resistor for determining an amplification factor with respect to a signal voltage as input, said gain control circuit opening/closing said first switching device to vary a resistance value of said resistor in response to a pulse duty of said control signal pulse train, thereby adjusting said amplification factor with respect to said signal voltage; and a switched capacitor filter circuit including a second switching device opened/closed by said control signal pulse train supplied from said microprocessor and a charging/discharging capacitor connected to said second switching device, said switched capacitor filter circuit variably adjusting filter characteristics in response to a pulse frequency of said control signal pulse train, wherein said control signal pulse train is commonly supplied to said first and second switching devices.

2. The signal processor according to claim 1, further comprising a data converter circuit for converting a signal voltage obtained from a variable analog signal source through said switched capacitor filter circuit and said gain control circuit to a digital logic signal and inputting said digital logic signal to said microprocessor, wherein said microprocessor includes:

first calibration means for measuring the relation between said pulse duty of said control signal pulse train supplied to said gain control circuit and the state of said data converter circuit with a predetermined calibration-specific signal source being connected in place of said variable analog signal source, thereby obtaining a first calibration factor;

second calibration means for measuring the relation between said filter characteristics of said switched capacitor filter circuit and one of said pulse frequency and a pulse cycle of said control signal pulse train with said predetermined calibration-specific signal source being connected in place of said variable analog signal source, thereby obtaining a second calibration factor;

transfer-storage means for transferring and storing said first and second calibration factors to and in one of a partial region of a non-volatile data memory and a partial region of a non-volatile program memory; and control-signal-pulse-train generating means for calibrating said pulse duty and one of said pulse frequency and pulse cycle based on said first and second calibration factors stored in one of said partial region of said non-volatile data memory and said partial region of said non-volatile program memory, thereby generating said control signal pulse train.

3. The signal processor according to claim 2, wherein said data converter circuit is an analog comparator circuit for comparing said signal voltage obtained through said switched capacitor filter circuit and said gain variable circuit with a predetermined standard reference voltage, thereby inputting the result of comparison to said microprocessor as said digital logic signal, and said microprocessor further includes equivalent changing means for changing said pulse duty of said control signal pulse train to change an input/output ratio of said gain control circuit, thereby equivalently changing said standard reference voltage of said analog comparator circuit.

4. The signal processor according to claim 3, wherein said analog comparator circuit at least includes a first and a second comparator circuits, said digital logic signal includes a first digital logic signal and a second digital logic signal, said first comparator circuit compares said signal voltage obtained through said switched capacitor filter circuit and said gain control circuit with a first standard reference voltage, thereby inputting the result of comparison to said microprocessor as said first digital logic signal, and said second comparator circuit compares said signal voltage obtained through said switched capacitor filter circuit and said gain control circuit with a second standard reference voltage which is greater than said first standard reference voltage, thereby inputting the result of digital comparison to said microprocessor as said second digital logic signal.

5. The signal processor according to claim 2, wherein said data converter circuit is an AD converter for converting said signal voltage obtained through said switched capacitor filter circuit and said gain control circuit to a detected digital voltage and applying said detected digital voltage to said microprocessor, and said microprocessor further includes data processing means for changing said pulse duty of said control signal pulse train to change an input/output ratio of said gain control circuit, thereby equivalently changing a standard reference digital voltage and comparing said detected digital voltage from said AD converter and said standard reference digital voltage to output the result of digital comparison as said digital logic signal.

6. The signal processor according to claim 5, wherein said variable analog signal source includes a plurality of variable analog signal sources, and said AD converter is a multi-channel AD converter for successively converting signal voltages from said plurality of variable analog signal sources into digital form.

7. The signal processor according to claim 2, wherein said switched capacitor filter circuit constitutes a low-pass filter circuit for cutting off a high-frequency noise signal, and said gain control circuit includes a smoothing filter circuit in an output stage, said smoothing filter circuit having an integration time constant smaller than the minimum integration time constant of said switched capacitor filter circuit.

8. The signal processor according to claim 7, wherein said variable analog signal source includes a plurality of variable analog signal sources, said signal processor further comprising a multiplexer for selectively switching connection of said plurality of variable analog signal sources and said switched capacitor filter circuit and gain control circuit, wherein said microprocessor includes a connection-switching-signal generating means for successively generating a connection switching signal and supplying said connection switching signal to said multiplexer.

9. The signal processor according to claim 7, wherein said first calibration means measures a comparison-agreement pulse duty at which a signal voltage obtained from said calibration-specific signal source through said switched capacitor filter circuit and said gain control circuit agrees with said standard reference voltage of said data converter circuit while gradually increasing or decreasing said pulse duty of said control signal pulse train, thereby calculating the product of a voltage output from said calibration-specific signal source and said comparison-agreement pulse duty as said first calibration factor, and after said first calibration means, said second calibration means measures the time elapsed between connection of said predetermined calibration-specific signal source and change in the result of comparison made by said analog comparator circuit, to measure an integration time constant of said switched capacitor filter circuit, thereby calculating a ratio of said integration time constant to said pulse cycle of said control signal pulse train as said second calibration factor.

10. The signal processor according to claim 9, wherein said first calibration factor includes a plurality of calibration factors and said second calibration factor includes a plurality of second calibration factors, and said transfer-storage means includes repetitive calibration means for causing said first and second calibration means to obtain said first plurality of calibration factors and said plurality of second calibration factors, respectively, thereby calculating a statistic value including one of an average, mode and median of said plurality of first calibration factors and that of said plurality of second calibration factors to be transferred to and stored in one of said non-volatile data memory and said partial region of said non-volatile program memory.

11. The signal processor according to claim 7, wherein said first calibration means measures a detected digital voltage obtained by digitally converting a signal voltage into digital form by an AD converter, said signal voltage being obtained from said predetermined calibration-specific signal source through said switched capacitor filter circuit and said gain control circuit under a known pulse duty, thereby calculating a ratio of said detected digital voltage to a product of a voltage output from said predetermined calibration-specific signal source and said known pulse duty, and after said first calibration means, said second calibration means measures the time elapsed until an output from said AD converter when said predetermined calibration-specific signal source is used reaches said detected digital voltage obtained by said first calibration means, to measure an integration time constant of said switched capacitor filter circuit, thereby calculating a ratio of said integration time constant to said pulse cycle of said control signal pulse train.

12. The signal processor according to claim 7, wherein said first calibration means measures a comparison-agreement pulse duty at which a detected voltage obtained by converting a signal voltage obtained from said calibration-specific signal source through said switched capacitor filter circuit and said gain control circuit into digital form by said AD converter agrees with said standard reference digital voltage while gradually increasing or decreasing said pulse duty of said control signal pulse train, thereby calculating a ratio of said standard reference digital voltage to the product of a voltage output from said predetermined calibration-specific signal source and said known pulse duty, as said first calibration factor, and after said first calibration means, said second calibration means measures the time elapsed until an output from said AD converter when said predetermined calibration-specific signal source is used reaches said standard reference digital voltage, to measure an integration time constant of said switched capacitor filter circuit, thereby calculating a ratio of said integration time constant to said pulse cycle of said control signal pulse train, as said second calibration factor.

13. The signal processor according to claim 2, further comprising a peak hold circuit including a maximum-value storage capacitor charged through a backflow prevention diode and a discharging switching device for periodically discharging electric charges in said maximum-value storage capacitor, said peak hold circuit being provided between a band-pass filter circuit and said data converter circuit, wherein said variable analog signal source generates a pulsation signal, said switched capacitor filter circuit constitutes said band-pass filter circuit whose center frequency is variably adjusted in response to said pulse frequency of said control signal pulse train, and said microprocessor further includes data-acquisition-timing generating means for periodically generating an acquisition timing signal for transferring said digital logic signal to a RAM memory through said data converter circuit and said microprocessor and storing said digital logic signal in said RAM memory after said discharging switching device is closed to discharge electric charges of said maximum-value storage capacitor and is then opened to cause recharge of said maximum-value storage capacitor for a predetermined time period, said digital logic signal being related to a voltage applied in said recharge.

14. The signal processor according to claim 13, wherein said variable analog signal source includes a plurality of variable analog signal sources, said signal processor further comprising a multiplexer for selectively switching connection of said plurality of variable analog signal sources and said switched capacitor filter circuit and gain control circuit, and said microprocessor includes a connection-switching-signal generating means for successively generating a connection switching signal and supplying said connection switching signal to said multiplexer.

15. The signal processor according to claim 13, wherein said second calibration means measures a pulse frequency at which the trend of a detected digital voltage at an AD converter changes as a center pulse frequency while gradually increasing or decreasing a pulse frequency of said control signal pulse train having a predetermined pulse duty using said predetermined calibration-specific signal source having a predetermined signal amplitude and a predetermined signal frequency, thereby calculating a ratio of said signal frequency to said center pulse frequency as a second calibration factor, and after said second calibration means, said first calibration means measures said detected digital voltage at said AD converter using said predetermined calibration-specific signal source, said pulse duty of said control signal pulse train and said center pulse frequency applied in said second calibration means, thereby calculating a ratio of said detected digital voltage to the product of said signal amplitude and said pulse duty applied in said second calibration means, as a first calibration factor.

16. The signal processor according to claim 15, wherein after said second calibration means, said first calibration means measures, as a detected pulse duty, said pulse duty at which the result of digital comparison between said detected digital voltage at said AD converter and a standard reference digital voltage changes while gradually increasing or decreasing said pulse duty of said control signal pulse train using said predetermined calibration-specific signal source and said center pulse frequency applied in said second calibration means, thereby calculating a ratio of said standard reference digital voltage to the product of said signal amplitude and said detected pulse duty, as another first calibration factor.

17. The signal processor according to claim 15, wherein said second calibration means measures a first frequency and a second frequency at which the result of digital comparison between said detected digital voltage at said AD converter and a standard reference digital voltage changes while gradually increasing or decreasing said pulse frequency of said control signal pulse train having said predetermined pulse duty using said predetermined calibration-specific signal source having said predetermined signal amplitude and a predetermined signal frequency, to obtain said center pulse frequency based on said first and second frequencies, thereby calculating a ratio of said signal frequency to said center pulse frequency as another second calibration factor.

18. The signal processor according to claim 13, wherein said second calibration means measures a first frequency and a second frequency at which the result of comparison made by said analog comparator circuit using said predetermined calibration-specific signal source having said predetermined signal amplitude and said signal frequency while gradually increasing or decreasing said pulse frequency of said control signal pulse train having said predetermined pulse duty, to obtain said center pulse frequency based on said first and second frequencies, thereby calculating a ratio of said signal frequency to said center pulse frequency as a second calibration factor, and after said second calibration means, said first calibration means measures, as a detected pulse duty, said pulse duty at which the result of comparison made by said analog comparator circuit changes using said predetermined calibration-specific signal source and said center pulse frequency applied in said second calibration means while gradually increasing or decreasing said pulse duty of said control signal pulse train, thereby calculating the product of said detected pulse duty and said signal amplitude as said first calibration factor.

19. The signal processor according to claim 13, wherein said variable analog signal source includes a plurality of variable analog signal sources, and said plurality of variable analog signal sources are a plurality of knock sensors respectively provided for a plurality of cylinders of an internal combustion engine for detecting cylinder vibrations, each of said plurality of knock sensors generating said pulsation signal, said signal processor further comprising a multiplexer for selectively switching connection of said plurality of knock sensors and said switched capacitor filter circuit and said gain control circuit, wherein said microprocessor further includes connection-switching-signal generating means for successively generating a connection switching signal and supplying said connection switching signal to said multiplexer for causing said multiplexer to select, in response to a detected angle by a clank angle sensor of said internal combustion engine, one of said plurality of knock sensors provided for one of said plurality of cylinders that is in the state just before an explosion step, and said data-acquisition-timing generating means determines the timing of data acquisition in response to said detected angle by said clank angle sensor.

* * * * *